US012160278B2

(12) United States Patent
Lim et al.

(10) Patent No.: US 12,160,278 B2
(45) Date of Patent: Dec. 3, 2024

(54) PORTABLE RADIO PROVIDING RADIO FREQUENCY (RF) LOAD DETECTION, IDENTIFICATION, AND CONFIGURATION

(71) Applicant: MOTOROLA SOLUTIONS, INC., Chicago, IL (US)

(72) Inventors: Bing Qin Lim, Bayan Lepas (MY); Chern Yee Kok, Gelugor (MY); Siew Im Low, Palau Pinang (MY); Alexander Oon, Bayan Lepas (MY); Yew Hui Liew, Bayan Lepas (MY); Ming Yeh Koh, BDR Baru Air Itam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 409 days.

(21) Appl. No.: 17/660,846

(22) Filed: Apr. 27, 2022

(65) Prior Publication Data
US 2023/0353258 A1 Nov. 2, 2023

(51) Int. Cl.
*H04B 17/13* (2015.01)
*H04B 1/04* (2006.01)
*H04B 1/18* (2006.01)
*H04B 17/12* (2015.01)

(52) U.S. Cl.
CPC ........... *H04B 17/13* (2015.01); *H04B 1/0458* (2013.01); *H04B 17/12* (2015.01)

(58) Field of Classification Search
CPC ....... H04B 17/13; H04B 17/12; H04B 1/0458
See application file for complete search history.

(56) References Cited

U.S. PATENT DOCUMENTS

| | | | |
|---|---|---|---|
| 9,825,364 B2 | 11/2017 | O'Driscoll | |
| 2004/0075504 A1* | 4/2004 | Vintola | H03F 1/52 330/298 |
| 2004/0127247 A1 | 7/2004 | Reece et al. | |
| 2007/0004344 A1 | 1/2007 | DeGroot et al. | |
| 2007/0091006 A1 | 4/2007 | Thober et al. | |
| 2008/0129610 A1* | 6/2008 | Tsfati | H03D 3/007 343/702 |

(Continued)

*Primary Examiner* — Yuwen Pan
*Assistant Examiner* — Daniel Christian Paglia
(74) *Attorney, Agent, or Firm* — Barbara R Doutre

(57) ABSTRACT

A portable radio is provided that performs an impedance measurement to determine a radio frequency (RF) load type connected to an antenna port of the portable radio. The portable radio includes an impedance measurement circuit and a tunable matching circuit operatively coupled thereto through an RF switch A sweep generator injects an LMR frequency sweep to the RF load during non-transmit or non-receive time slots for the impedance measurement. The tunable matching circuit is configured as a radio frequency (RF) bypass during the impedance measurement, thereby enabling the impedance measurement circuit to directly measure the impedance of the RF load coupled to the RF port and identify the RF load as either a land mobile radio (LMR) antenna or equipment (wideband load). When the RF load is determined to be an LMR antenna, then the matching circuitry is tuned for the identified antenna. When the RF load is determined to be wideband equipment, then the matching circuitry remains bypassed.

22 Claims, 8 Drawing Sheets

(56) References Cited

U.S. PATENT DOCUMENTS

| | | | |
|---|---|---|---|
| 2012/0021700 A1* | 1/2012 | Beghini | H04W 76/10 |
| | | | 455/90.2 |
| 2014/0225790 A1 | 8/2014 | Levin et al. | |
| 2015/0146582 A1* | 5/2015 | Galan | H04L 5/1461 |
| | | | 370/278 |
| 2017/0352947 A1 | 12/2017 | Solomko et al. | |
| 2020/0194867 A1* | 6/2020 | Lee | H01Q 1/06 |

* cited by examiner

PORTABLE RADIO PROVIDING RADIO FREQUENCY (RF) LOAD DETECTION, IDENTIFICATION, AND CONFIGURATION

BACKGROUND

Portable communication devices, such as portable radios, used by first responders may be operated in a variety of public safety communication environments, such as law enforcement, fire rescue, and the like. These types of portable radios typically operate over a land mobile radio (LMR) system. The ability to maintain communications remains paramount, and to this end, continued improvements in technology relating to portable radio antenna performance are desired. External portable radio antennas come in different lengths, with the best antenna performance typically being achieved with a longer antenna. However, there is a strong customer desire to use shorter antennas whenever possible for convenience and comfort of the user. Additionally, a portable radio may also need to be analyzed via RF measurement equipment coupled to an antenna port of the portable radio.

There is a further desire to have a portable radio identify the type of antenna to which it is connected. Some approaches to antenna identification include the use of a sensing element (for example, a grounded resistor) embedded within the antenna structure which may allow the portable radio to identify the type of antenna to which it is connected. However, the use of an embedded sensor requires additional piece parts, increases cost and may not be feasible for certain types of antenna reception connectors. For example, the resistor-to-ground sensor approach cannot be used for a ferrule antenna, where there is no ground connection between the external antenna and portable radio.

Hence, there is a need for a portable radio that can identify an RF load and configure itself for the identified RF load.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figures 1A, 1B:
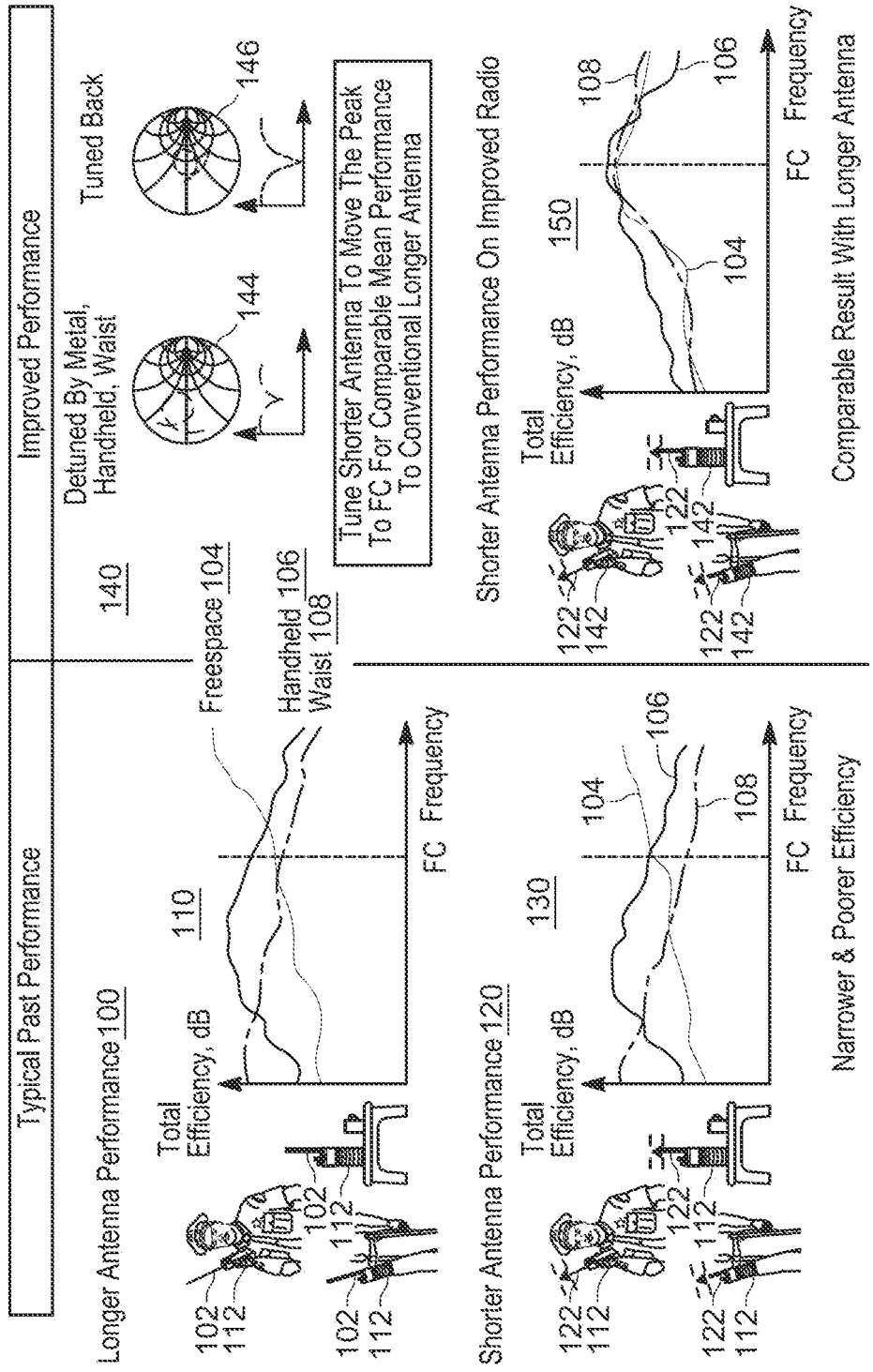
FIG. 1A illustrates examples of typical long antenna performance and short antenna performance on a typical portable radio contrasted to FIG. 1B which illustrates short antenna performance achieved with a portable radio formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a portable radio that performs an impedance measurement to determine a radio frequency (RF) load type connected to an antenna port of the portable radio. The portable radio includes an impedance measurement circuit and a tunable matching circuit operatively coupled thereto through an RF switch A sweep generator injects a land mobile radio (LMR) frequency sweep to a Wheatstone bridge that is coupled to the RF load during non-transmit or non-receive time slots for the impedance measurement. The tunable matching circuit is configured as an RF bypass during the impedance measurement, thereby enabling the impedance measurement circuit to directly measure the impedance of the RF load coupled to the RF port and identify the RF load as either a land mobile radio (LMR) antenna or an equipment load (the equipment load being a wideband 50-ohm load which may also be referred to as wideband load or wideband equipment or RF analysis equipment). If the RF load is determined to be an LMR antenna, then the matching circuitry may be optimized for the identified antenna. If the RF load is determined to be wideband equipment, then the matching circuitry remains bypassed.

The portable radio may further use the impedance measurement to identify a faulty or broken antenna, a wrong antenna that operates at a frequency different from the current talkgroup channel frequency, and a wrong antenna that operates at frequency within the current talkgroup channel frequency but not at an optimum range suitable for current talkgroup operation.

For the purposes of this application the portable radio is considered to be a land mobile radio (LMR) operating within an LMR communication system. The LMR communication system provides person-to-person voice communication widely used by public safety and first responder organizations such as law enforcement, fire, and ambulance agencies, and other organizations, services or agencies. The LMR communication system is half-duplex, with multiple portable radios sharing a single radio channel, so only one portable radio can transmit at a time. The portable radio is normally in receiving mode so the user can hear other radios (a talkgroup) on the channel. Voice communication over an LMR communication system uses narrowband audio. When a user wants to talk, for example in a talkgroup call, the user presses a push-to-talk (PTT) button on the portable radio, which turns on the transmitter of the portable radio. The LMR communication system includes various network elements that assist in facilitating communication between portable radios, such as base stations, servers, dispatch consoles, data applications, and RF conventional or trunked sites. The portable radio operating within the LMR communication system comprises a two-way radio receiver and transmitter, controller, and audio circuitry. For the purposes of this application, the portable radio is considered to be a handheld type device having an antenna port which can be coupled to a removable external antenna or RF analysis equipment. The external antenna may be a longer (whip) antenna or a shorter (stubby) antenna. For example, a UHF band whip antenna (15 cm long) covers bandwidth of 127 MHz from 400 MHz to 527 MHz, a shorter UHF stubby antenna (9 cm long) can only cover narrower 50 MHz bandwidth and need to interchanging to three different stubby antennas to cover the entire band (for example, one stubby antenna cover 400 MHz to 450 MHz, another stubby antenna cover 440 to 490 MHz, and one more stubby antenna to cover 470 MHz to 527 MHz). Thus when a user intends to switch from one talkgroup channel to another talkgroup channel that is not supported or not optimal using the current stubby antenna, the user needs to disconnect the current stubby antenna and change to another suitable stubby antenna. In general, a longer whip antenna has better antenna efficiency and wider bandwidth compared to shorter antenna. The embodiments provided herein enable the portable radio to adapt to a long antenna, a short antenna, and RF equipment. The portable radio may use a shorter antenna and still achieve comparable performance to a longer antenna.

FIG. 1A illustrates examples of typical long antenna performance 100 and short antenna performance 120 for a typical portable radio 112, contrasted to FIG. 1B which illustrates short antenna performance 140 achieved with a portable radio 142 formed and operating in accordance with some embodiments.

FIG. 1A further shows a typical LMR portable radio 112 having a long (whip) antenna 102 coupled thereto being measured for efficiency in free space 104, handheld 106, and waist-held 108 positions. A graph 110 illustrates frequency along a horizontal axis vs. total efficiency (dB) along a vertical axis with graphical mean representations for each radio position (free space 104, handheld 106, and waist-held 108 positions) for the longer antenna 102. Channel frequency (Fc) of a talkgroup, for example, is indicated on the horizontal frequency axis. As shown in graph 110, the total efficiency of antenna 102 at frequency Fc shifted to different values under different radio position scenarios of free space, handheld, and waist-held.

FIG. 1A further shows a shorter (stubby) antenna 122 coupled to the typical portable radio 112 being measured for efficiency in free space 104, handheld 106, and waist-held 108 positions. A graph 130 illustrates frequency along a horizontal axis vs. total efficiency (dB) along a vertical axis with graphical mean representations for each radio position (free space 104, handheld 106, and waist-held 108 positions) for the shorter antenna 122. As shown in graph 130, antenna total efficiency drops (lower in dB value) and bandwidth becomes narrower (narrower frequency range has acceptable antenna efficiency performance) compared to longer whip antenna 102 (as shown in graph 110).

As further shown in FIG. 1A, the longer (whip) antenna 102 provides better efficiency performance at the channel frequency (Fc) of operation than the shorter (stubby) antenna 122, when coupled to the same typical portable radio 112. In addition, in both scenarios of longer antenna 102 and shorter antenna 122, the channel frequency (Fc) is not at the optimum frequency of the antenna, and the antenna total efficiency varies at different radio positions.

FIG. 1B illustrates an example of antenna performance 140 achieved with the short antenna 122 coupled to a portable radio 142, the portable radio 142 being formed and operating in accordance with some embodiments. Efficiency in free space 104, handheld 106, and waist-held 108 positions are illustrated on a graph 150. Graph 150 illustrates operating frequency along a horizontal axis vs. total efficiency (dB) along a vertical axis with graphical mean representations for each radio position (free space 104, handheld 106, and waist-held 108 positions) for the shorter antenna 122 tuned for optimum efficiency at the channel frequency (Fc) of operation.

As can be seen by graph 150 of FIG. 1B, the portable radio 142 having the shorter (stubby) antenna 122 coupled thereto is able to achieve comparable efficiency to that of the longer antenna 102 of graph 110 of FIG. 1A. In all radio positions (free space 104, handheld 106, and waist-held 108 positions), the antenna total efficiency performance is dynamically tuned to have the optimum performance at the channel frequency (Fc). As further shown under antenna performance 140, a Smith Chart 144 illustrates a detuned antenna impedance (for example, antenna is detuned and shifted in impedance and performance when metal, hand or waist is in close proximity to the antenna) and return loss associated therewith, as compared to Smith Chart 146 which shows the shorter antenna tuned to have impedance near to 50-ohm at the channel frequency (Fc) of operation, thus having the peak of return loss falling at the Fc frequency and have lower return loss (better) at the Fc frequency. Better return loss at Fc frequency will then enable a better antenna efficiency performance, and in this example, achieving comparable mean performance to the longer antenna.

Figure 2:
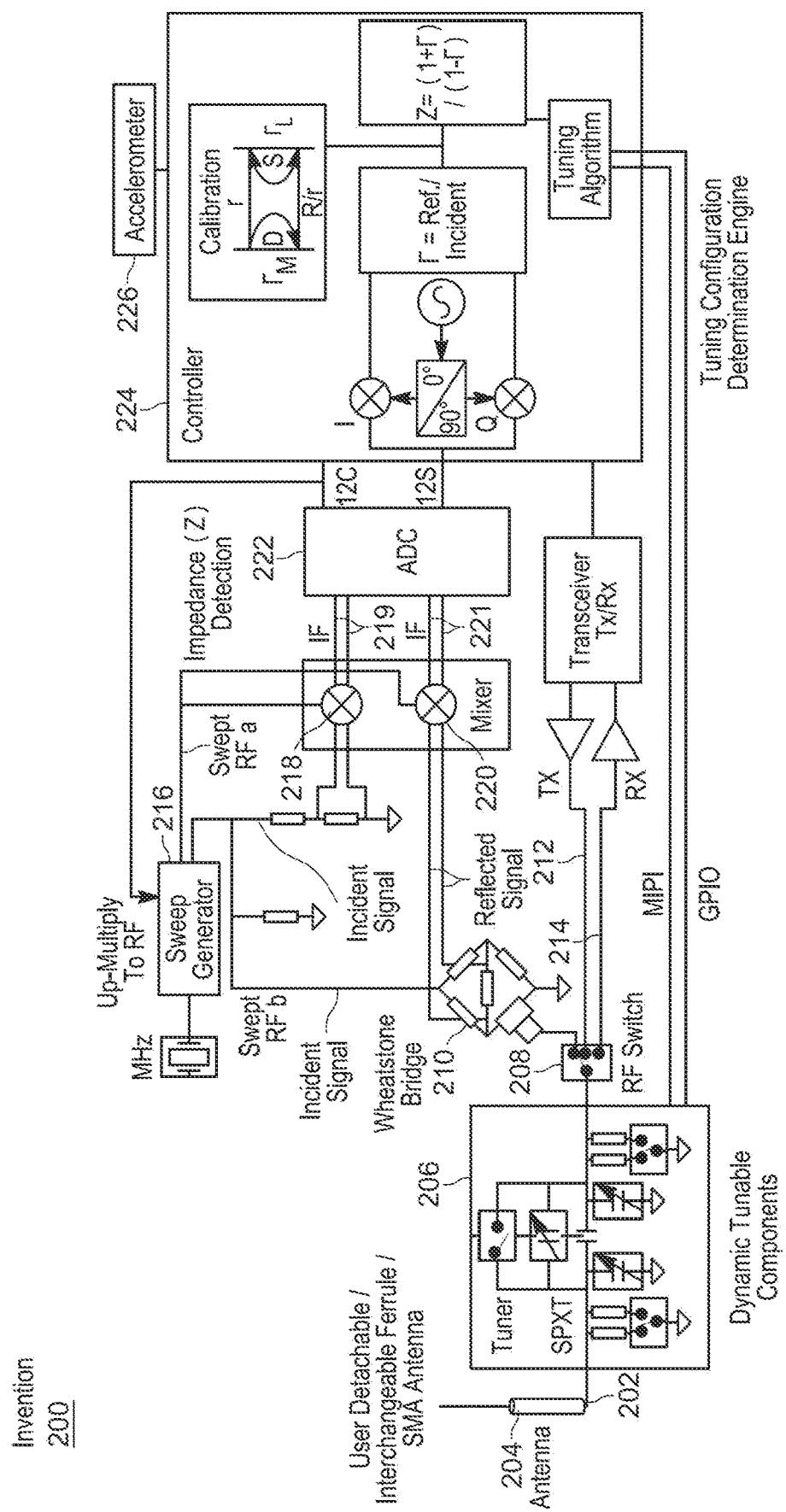
FIG. 2 is a block diagram of a portable radio in accordance with some embodiments.

FIG. 2 is a block diagram of a portable radio 200 formed and operating in accordance with some embodiments. The portable radio 200 comprises a radio frequency (RF) antenna port 202 for connecting to a RF load 204, wherein the RF load may comprise a detachable and interchangeable antenna, or a 50-ohm wideband equipment load, such as spectrum analyzer, signal source analyzer, signal generator, network analyzer and the like (such as shown in FIG. 3B). The portable radio 200 further comprises tunable matching circuit 206 coupled to the RF antenna port 202, and a radio frequency (RF) switch 208 switchably coupled between the tunable antenna matching circuit 206, a Wheatstone bridge 210, and LMR transmit circuit 212 and LMR receive circuit 214. The portable radio 200 further comprises a frequency sweep generator 216 which is coupled to a first mixer circuit 218 and the Wheatstone bridge 210.

The portable radio includes a controller 224 which provides microprocessor functionality for controlling the radio circuitry for land mobile radio (LMR) communication, such communications including transmit, receive, and standby/idle and/or battery save modes. The portable radio 200 communicates using time division multiple access (TDMA) technology which allows several users to share the same frequency channel by dividing the signal into different time slots.

In accordance with some embodiments, a motion sensor 226, such as accelerometer, may be coupled to controller 224 to detect motion of the portable radio. Motion exceeding a predetermined motion threshold and/or RSSI fluctuation exceeding a predetermined RSSI threshold may be used to indicate a potential change at the RF load coupled to antenna port 202. The controller 224 further includes a countdown timer (hardware or software timer) configured to trigger RF load impedance measurements based on the severity of the detected motion and/or RSSI fluctuations. In accordance with some embodiments, the RF load impedance measurements are taken during non-transmit and/or non-receive time slots of LMR TDMA communication. The RF load impedance measurements are used to indicate the type of RF load coupled to RF port 202 (antenna or wideband equipment). Identification of the type of RF load further includes detection of faulty, broken, or non-optimum antenna for a particular task). The controller 224 controls appropriate tuning, bypassing, and/or alerts are made based on the identified RF load coupled to port 202. The manner of measuring the impedance is described next.

In accordance with the embodiments, the tunable matching circuit 206 is switchably coupled to the Wheatstone bridge 210, via the RF switch 208, during non-transmit and non-receive states of the LMR transmit circuit 212 and LMR receive circuit 214 for RF load impedance measurement. The sweep generator 216 generates first and second swept RF signals, noted as swept 'RFa' signal and swept 'RFb' signal—these signals are LMR frequency signals having a delta frequency therebetween equivalent to an intermediate frequency (IF). The swept RFa signal is input to both the first mixer 218 and a second mixer 220. The incident signal (RFb signal) is a swept LMR RF signal that is derived based on a current talkgroup channel of the portable radio. For example, if the current talkgroup is configured to LMR channel frequency of 450 MHz, then the incident signal from sweep generator 216 will sweep from, say, 400 MHz to 500 MHz, with a frequency step size of 5 MHz. For the antenna impedance measurement, the frequency sweep generator 216 injects the incident signal (RFb) to the first mixer circuit 218, and the frequency sweep generator 216 also injects the incident signal (RFb) to the Wheatstone bridge 210 where it is reflected to generate a reflected incident differential signal (where the amplitude and phase of the reflected incident differential signal vary based on the impedance of the RF load). The reflected incident differential signal is coupled to the second mixer circuit 220.

The first mixer circuit 218 mixes the first swept signal 'RFa' with the incident signal to generate an incident mixed down signal 219 (also referred to as first differential IF signal 219). The second mixer circuit 220 mixes the first swept signal 'RFa' with the reflected incident differential signal to generate reflected mixed down signal 221 (second differential IF signal). In other words, the first mixer circuit 218 and second mixer circuit 220 respectively convert the incident signal and reflected incident differential signal into an incident mixed down signal 219 (first differential IF signal) and a reflected incident mixed down signal 221 (second differential IF signal).

An analog to digital converter (ADC) 222, converts the incident mixed down signal 219 (first differential IF signal) and the reflected incident mixed down signal 221 (second differential IF signal) into a digital signal suitable over a serial bus (I2S bus) input to the controller 224. The controller 224 uses an I2C bus line (output) to control both the ADC 222 and sweep generator 216. For example, the I2C bus line may be used to program the sweep frequency and the timing of performing the sweep by the sweep generator 216 based on a determined sample rate value and current talkgroup channel frequency.

The controller 224 of the portable radio receives the mixed down signals 219, 221 and generates two complex signals (I/Q signals). Incident mixed down signal 219 is converted to incident complex signal. Reflected incident mixed down signal 221 is converted into reflected incident complex signal. For example, the controller may include a complex value signal generator, i.e. a signal generator that has "real" and 'imaginary' outputs, also known as "quadrature" outputs. Both the incident mixed down signal 219 and reflected incident mixed down signal 221 are converted to an incident complex signal and a reflected complex signal with real and imaginary values by correlating the incident mixed down signal 219 and reflected incident mixed down signal 221 to a sine and a cosine reference signal that are in quadrature phase.

When portable radio 200 measures the RF load impedance, the controller 224 configures the tunable matching circuit 206 to present a RF bypass between the RF antenna port 202 and RF switch 208, so that impedance measurement can be performed directly on the RF load. The RF bypass can be achieved by, for example, controlling a RF switch that is coupled between the input and output of the tunable matching circuit 206 to become a short or a connected path, controlling a tunable capacitor that is coupled between the input and output of the tunable matching circuit 206 to a capacitance value that presents a very low impedance at the swept RF frequency, and/or controlling a shunt component of the tunable matching circuit 206 to be an open connection (for example, via a switch) or to a high impedance at the swept RF frequency (for example, via configuring shunt tunable component to 0 pF or self resonance frequency of the shunt component). A shunt component is a tunable matching component where one terminal end is connected to ground signal. The tunable matching circuit 206 is configurable by the controller 224, via general purpose output (GPO), Mobile Industry Processor Interface (MIPI) interface, or other communication bus between controller 224 and tunable matching circuit 206. If a RF bypass is not achievable (for example, the tunable matching components are not able to be configured to present a RF bypass), an impedance transfer function of the configured tunable matching circuit (tunable matching circuit components and their values under each configuration known a priori) can be used to determine the impedance of the RF load by applying the impedance transfer function (transfer function of how the tunable matching circuit change the RF load) to the impedance measured by the impedance measurement circuit.

After the controller 224 determines the incident complex signal and reflected complex signal, the controller is configured to determine the impedance of the RF load 204 by calculating an impedance (Z), a resistance (R) and a reactance (X) from the complex signals. The controller calculates the complex reflection coefficient (Γ) by complex dividing the reflected complex signal with the incident reflected complex signal. In one example, the controller may calibrate the complex reflection coefficient (Γ) by using formula:

$$\Gamma_L = (\Gamma_M - D)/[RT + S(\Gamma_M - D)],$$

wherein, $\Gamma_L$ is the calibrated reflection coefficient Γ, $\Gamma_M$ is the measured reflection coefficient Γ using above mentioned method, D is the directivity value which indicating the leakage signal from incident signal path to reflected signal path, RT is the reflection tracking value which indicating the loss of signal along the incident signal path and the reflected signal path, and S is the source match that indicates the mismatch reflection at RF port 202.

The value of D, RT and S is predetermined and prestored inside a memory of portable radio 200, when the portable radio 200 is under calibration process using known impedance of open load, short load and 50-ohm load of a standard calibration kit.

Then, the controller 224 further calculates the impedance (Z) in complex value by using formula:

$$Z=(1+\Gamma)/(1-\Gamma),$$

wherein,

Γ is the complex reflection coefficient,

Z is the impedance in complex value, consisting of real value of resistance (R) and imaginary value of reactance (X), wherein Z=R+jX.

In accordance with the embodiments, the tunable matching components of tunable matching circuit 206 are configured based on the identified RF load. If the RF load impedance is identified as an antenna load, the controller 224 configures the tunable matching circuit 206 to tune the antenna impedance as close to 50-ohm as possible. If the RF load impedance is identified as an wideband 50-ohm equipment load, the controller 224 configures the tunable matching circuit 206 to maintain the RF bypass.

The impedance detection and RF load type identification are advantageously achieved without requiring any additional sensing element (such as a grounded resistor) within the antenna, thereby enabling a resistorless antenna (or any suitable antenna without any additional sensing element built inside) to be used with the portable radio. This capability of impedance detection and identification without sensing element inside the antenna allows the RF port 202 to be either a ferrule antenna connector to receive a ferrule antenna (which has no ground) or a SubMiniature Version A (SMA) antenna connector to receive a SMA antenna.

Figure 3A:
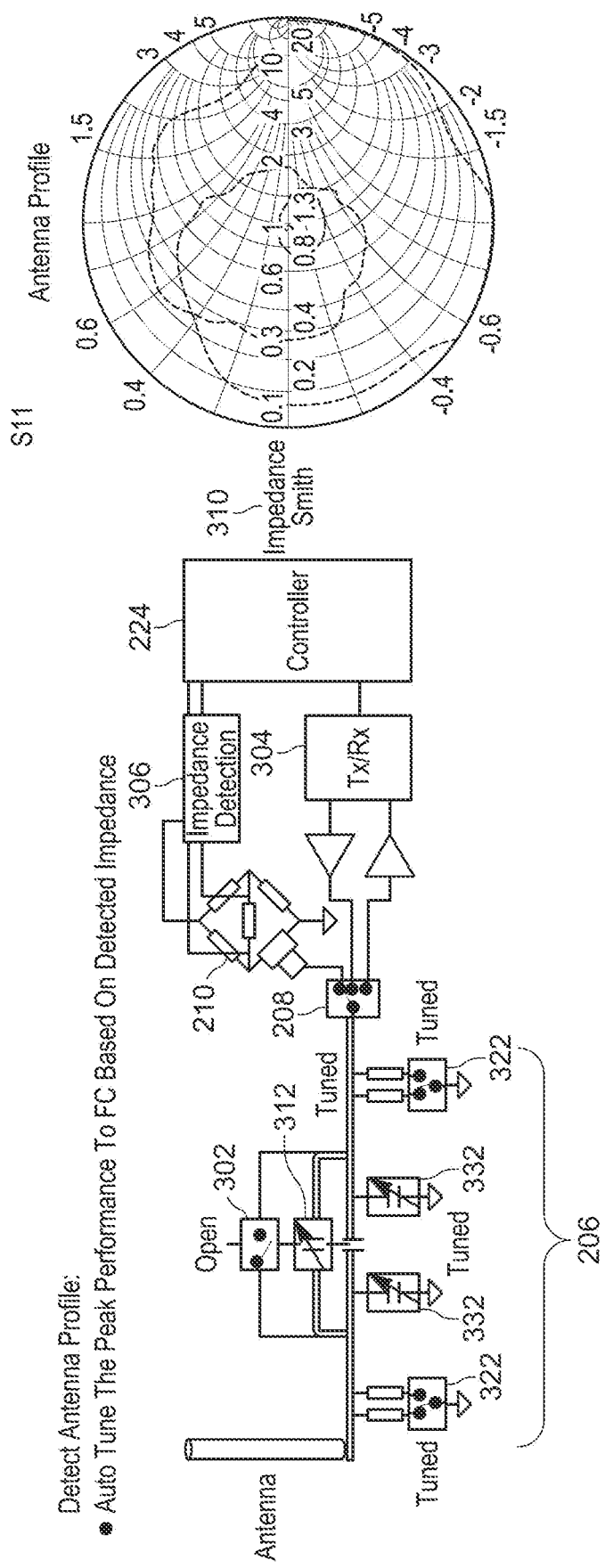
FIG. 3A is an example of a portable radio having an antenna load attached thereto in accordance with some embodiments.
Figure 3B:
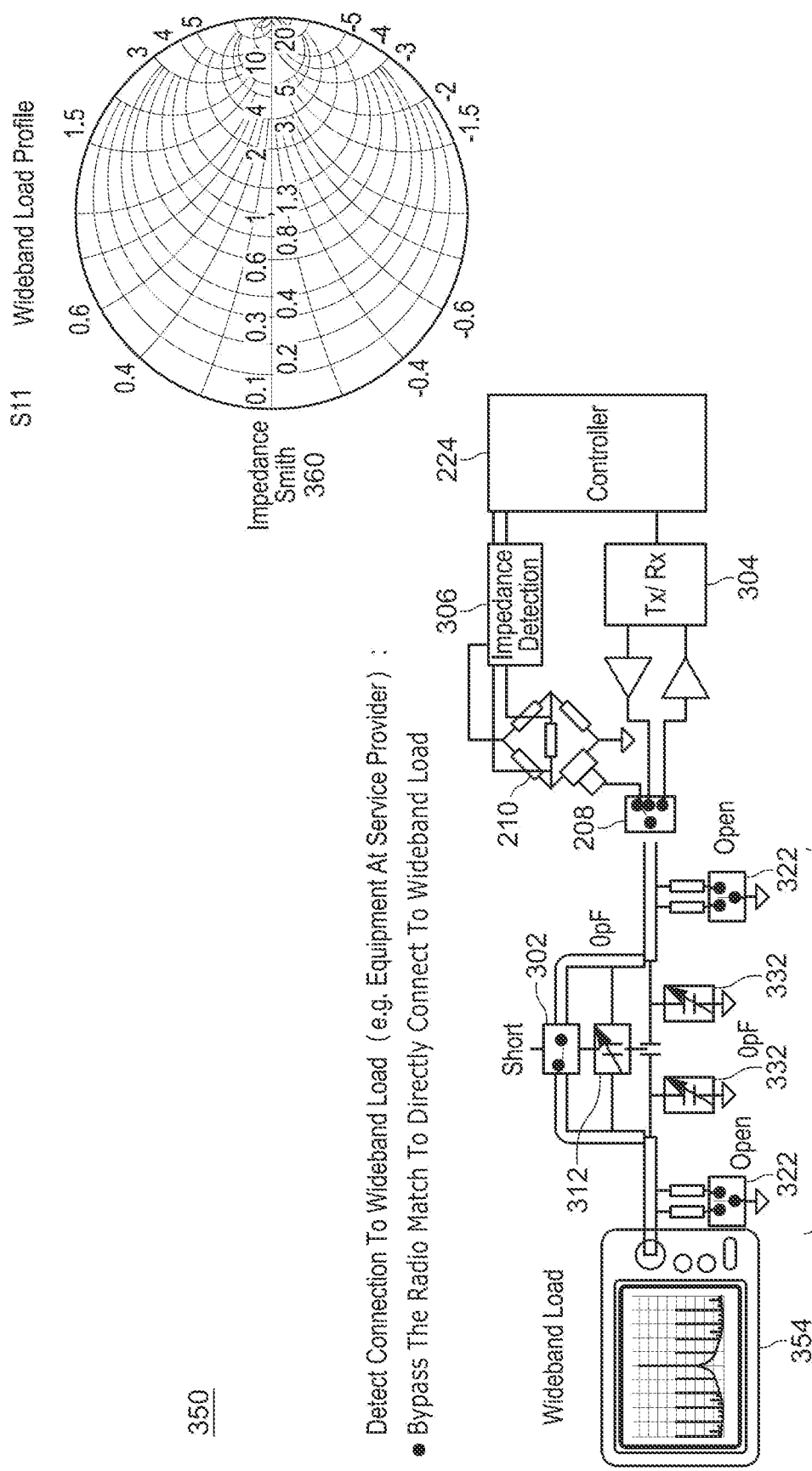
FIG. 3B is an example of a second portable radio configuration for wideband equipment load attachment in accordance with some embodiments.

FIGS. 3A and 3B show examples of how to determine the RF load type coupled to the portable radio formed and operating in accordance with some embodiments. Impedance detection 306 represents the sweep generator, mixers, and ADC of FIG. 2. To determine if the RF load is an antenna or a wideband equipment load, the matching circuit 206 is configured as a RF bypass so that the impedance detection circuitry 306 can directly determine the RF load impedance which indicates the load type associated therewith. When the RF load is determined to be an antenna, an initial matching configuration will be configured at matching circuit 206 based on the detected antenna impedance, and fine tuning is continued on the matching to match to 50-ohm. When the RF load is determined to be equipment (wideband load) 354, then the RF bypass of the matching circuit 206 is maintained. The equipment wideband load 354 may be test equipment, such as spectrum analyzer, signal source analyzer, signal generator, network analyzer and the like.

Referring to FIG. 3A in more operational detail, the matching circuit 206 is switchably coupled to the Wheatstone bridge 210, via the RF switch 208, during non-transmit and non-receive state of LMR transmit circuit and LMR receive circuit for impedance measurement of the load while an LMR frequency sweep is performed by impedance detection circuitry 306.

Impedance detection 306 performs the frequency sweep, as previously described through the bridge, to determine the impedance of the load (using RF bypass settings of the matching circuit 206). The impedance of the load identifies the load as being an LMR RF antenna and provides an antenna profile with the complex reflection coefficient (Γ) and the derived impedance (Z), and/or S11 measurements (S11 is the magnitude value of reflection coefficient in decibels (dB) calculated from the complex reflection coefficient). An example of an antenna profile in impedance (Z), resistance (R) and reactance (X) is shown at Smith Chart 310. The closer the antenna impedance (Z) of the operating channel frequency (Fc) to the center of the Smith Chart (50-ohm point), the lower the undesired reflection of the antenna, and thus the better the antenna efficiency. S11 represents how much power is reflected from the antenna, and hence is known as the reflection coefficient. If S11=0 dB, then all the power is reflected from the antenna and nothing is radiated. The portable radio will tune the tunable matching circuit 206 so that the impedance (Z) of the antenna is as close as 50-ohm (as close as to the center of Smith Chart) at the channel frequency to enable as low value of S11 (the lower the S11, the more signal power will be radiated out the antenna).

As mentioned previously, the antenna profile is a unique impedance location pattern on a Smith Chart that is able to identify a type of antenna. Different types of antenna may include for example, antennas of different frequency bands (for example, UHF band antenna, VHF band antenna), or multiple LMR bands (for example, an antenna that supports both UHF and 800 MHz bands). Different antenna lengths (for example, whip antenna, stubby antenna) provide different range coverage, the range coverage may be identified by the antenna profile. Identifying the different types of antennas facilitates determining suitability to support different types of radios (for example, professional and commercial radios (PCR), TETRA radios, to name a few). The different types of antenna can also come with different RF connectors (for example, ferrule connector or SMA connector).

A new matching configuration is then determined based on the antenna profile, and the matching circuit 206 is configured with the new matching configuration (for example, a tunable component can be configured to a particular capacitance, or inductance, via GPO or MIPI communication of FIG. 2). The new matching configuration can be determined, for example, by referring to a memory-stored look-up table that lists the matching configuration needed for each antenna profile, or for example, by determining an impedance transfer function needed to transform the antenna impedance to 50-ohm and determining the matching configuration based on the impedance transfer function, or for example, by configuring through multiple matching configurations and determining the best configuration that provides the lowest S11 value. For example, the RF tuning can be achieved by configuring a RF switch 302, in the tunable matching circuit 206 to be an open connection between input and output of the tunable matching component, and such as by configuring a series tunable capacitor 312 to be tuned at the channel frequency, configuring shunt tuning component(s) 322 to be tuned via a switch, and/or configuring shunt tuning component(s) 332 to be tuned at the channel frequency. The series tunable capacitor 312, shunt tuning component(s) 322 and shunt tuning component(s) 332 together transform the antenna impedance (match the antenna impedance) to approach 50-ohm Hence, the LMR transmit circuit and LMR receive circuit 304 will have a matched RF load of approximately 50-ohm at the channel frequency, which allows for optimum power transfer to and from the antenna (for optimum antenna efficiency at the channel frequency).

Impedance detection 306 then performs the frequency sweep again, through the Wheatstone bridge 210, to determine the impedance of the RF load together with the newly configured matching circuit 206, to determine if the new matching configuration provides an impedance that falls within a 50-ohm threshold.

If the impedance of the RF load together with the new matching circuit configuration exceeds the 50-ohm threshold, the controller 224 adjusts the matching components of matching circuit 206 to tune the antenna impedance to an impedance approaching 50-ohm for peak performance at a center frequency of operation of the LMR frequency sweep (the channel frequency being set for the talkgroup). In other words, the antenna impedance is tuned so that the antenna impedance is closest to 50-ohm at the frequency set as the channel frequency of the LMR talkgroup. The Wheatstone bridge can then be switched out of the line-up, and the RF switch 208 can switch in the land mobile radio (LMR) transmit circuit or LMR receive circuit 304 for optimum radio LMR operation (optimally transmitting and receiving LMR signal through the tuned antenna in optimum antenna efficiency in the air for LMR communication).

Referring to FIG. 3B in more operational detail, the matching circuit 206 is switchably coupled to the Wheatstone bridge 210, via the RF switch 208, during non-transmit and non-receive states of LMR transmit circuit and LMR receive circuit for impedance measurement of the load while an LMR frequency sweep is performed by impedance detection circuitry 306.

Impedance detection circuitry 306 performs the frequency sweep, as previously described through the Wheatstone bridge, to determine the impedance of the load (with the matching circuit 206 configured as a RF bypass mode). The impedance of the load identifies the load as being a wideband load (the RF load impedance is determined to be very close to 50-ohm at the center of the Smith Chart 360 over the entire swept frequency)—which then maintains the RF bypassing of the matching circuit 206. As mentioned, the RF bypass can be achieved by configuring a switch, such as RF switch 302, in the tunable matching circuit 206 to be a short connection between input and output of the tunable matching component, and such as by configuring a tunable capacitor 312 to be a value that presents a low impedance at the channel frequency between input and output of the tunable matching component, configuring the shunt tuning component(s) 322 to be an open circuit via a switch, and/or configuring shunt tuning component(s) 332 to present a high impedance at the channel frequency (for example, 0 pF or self resonance frequency of the shunt component). The Wheatstone bridge 210 can now be switched out of the line-up and RF switch 208 can switch in the land mobile radio (LMR) transmit circuit or LMR receive circuit 304 for testing the transmit and receive paths of the portable radio, via the connected wideband equipment 354

Figure 4A:
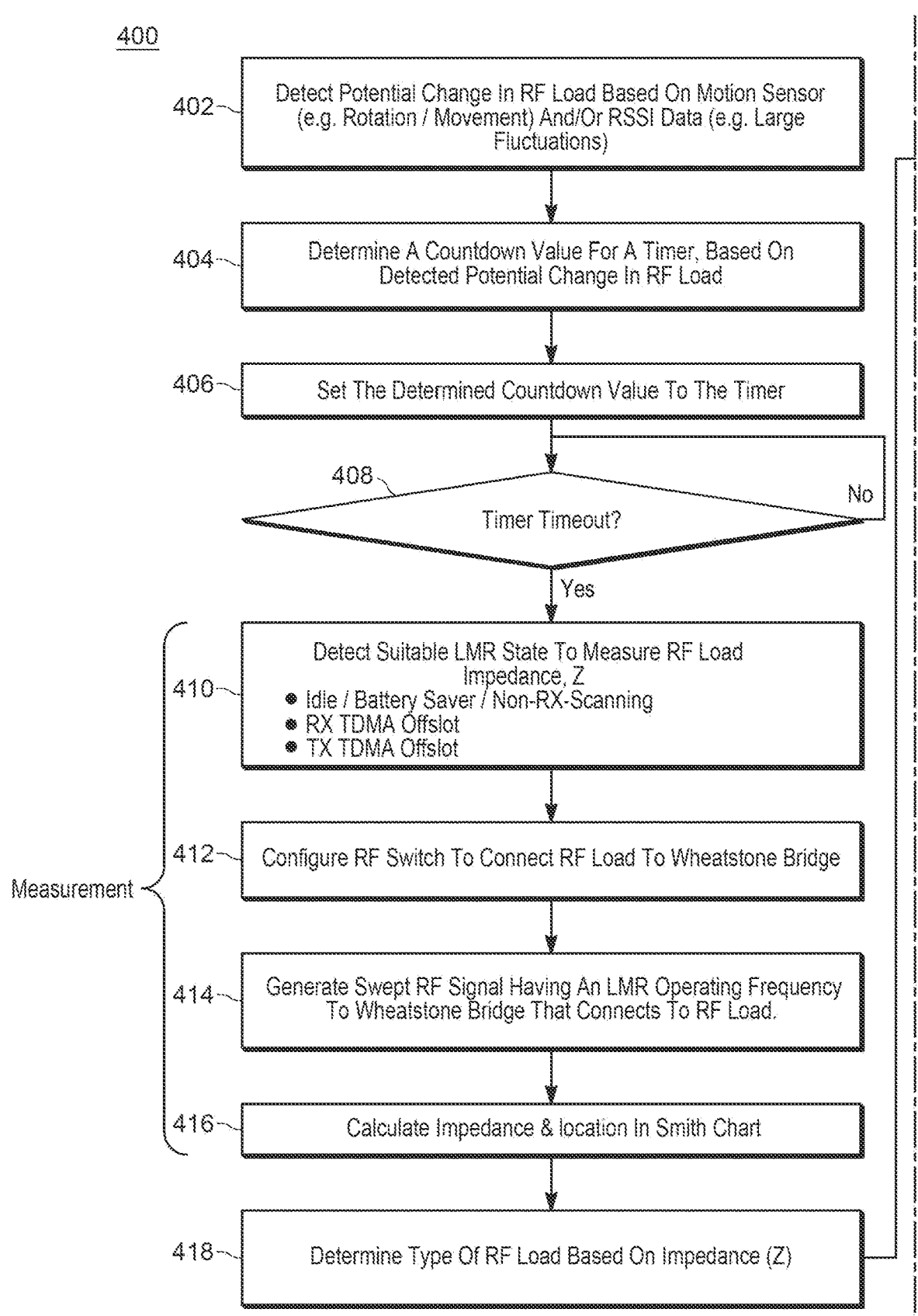
FIGS. 4A and 4B provide a flowchart of a method for detecting an RF load and performing a radio configuration in response thereto in accordance with some embodiments.
Figure 4B:
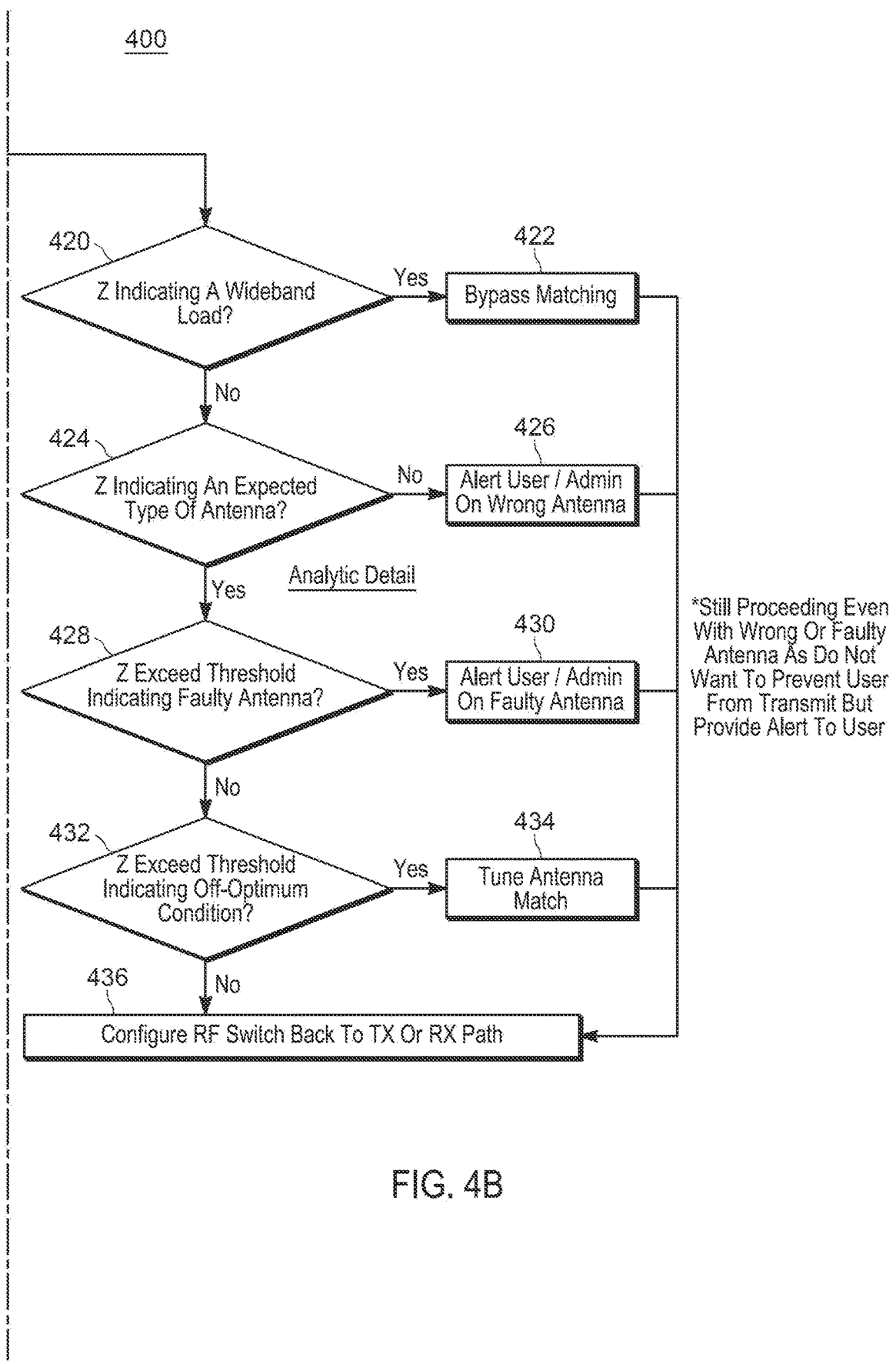

FIGS. 4A and 4B provide a flowchart of a method 400 for detecting a RF load and performing a radio configuration in response thereto in accordance with some embodiments. The description of method 400 will, at times, also refer back to elements of FIG. 2. Method 400 begins at 402 by detecting a potential change in a portable radio's RF load. The potential change in RF load may be detected, for example, by motion sensor (inside the portable radio 200) movements exceeding a predetermined movement threshold and/or large fluctuations in LMR communication received signal strength indicator (RSSI) measurement data exceeding a predetermined RSSI threshold. Both of these parameters are impacted by movement of the portable radio. A change of motion on the portable radio may indicate a likely change of antenna impedance when the radio is moved (for example, from handheld to being put on table, or when a user/first responder with the portable radio approaches or enters into an emergency vehicle, approaches a piece of metal). A change of LMR receive signal RSSI may indicate a change of antenna impedance to a non-optimal condition (for example, out of a 50-ohm threshold that causes poorer LMR receive sensitivity that results in change in RSSI value), such as when a user holds the radio brings the radio in proximity to metal objects. Changes in motion and fluctuation of RSSI can thus provide good indicator(s) of potential change at the RF load. Although not required, a combination of motion detection and RSSI fluctuation detection can provide improved accuracy for detecting a potential change to the RF load.

At 404, the method continues by determining a countdown value for a timer, based on a detected change in the RF Load. The countdown value is determined so as to provide a delay time period to start measurement of the RF load impedance. The timer is set to the countdown value at 406. Timeout of the countdown timer at 408 triggers the RF Load impedance measurement which takes place at steps of 410-416. A determination of the type of RF load based on the impedance (Z) is made at 418, with subsequent actions taking place at 420-436 for each type of identified RF load. Steps 408-436 will be described in greater detail later.

Each cycle through the method 400 may produce a different countdown value based on the current motion and/or RSSI fluctuation, thereby producing different countdown timer values for each cycle through the flowchart. The greater the change in movement and/or change in RSSI, the greater the impact on RF load impedance, and thus a shorter countdown timer value will be used. The lower the change in movement and/or change in RSSI, the lower the impact on RF load impedance, and thus a longer countdown timer value will be used.

Repetitive cycles through the method 400 allows controller (224) to configure a variable sampling rate for RF load impedance measurement based on the detected changes in the RF load. Again, the greater the changes in movement and/or change in RSSI, the greater the impact on RF load impedance. The different countdown timer values used to trigger the RF load impedance measurement for each cycle of the flowchart may thus be referred to as a variable sample rate for RF load impedance measurement. The controller (224) of the portable radio will configure a higher sampling rate (short countdown timer value) when motion (and/or change of RSSI) of the portable radio is/are high, and will configure a lower sampling rate (longer countdown timer value) when motion (and/or change of RSSI) of the portable radio is low. For example, a first RF load measurement may occur after a timer countdown of 300 ms (then complete remainder of method 400 and return to 402), a second RF load measurement may occur after a timer countdown of 100 ms (then complete remainder of method 400 and return to 402), and a third RF load measurement may occur after a timer countdown of 30 ms (then complete remainder of method 400 and return to 402) and so on.

A motion sensor (226), such as accelerometer of FIG. 2, may be used to detect motion of the portable radio at 402 and be used as a basis to determine the countdown timer value at 404 which will be used to trigger the RF load impedance measurement. For example, if the portable radio is moving fast, such as when a user takes the radio out from holster and moves it to a handheld position to talk, then a shorter countdown timer value (high sampling rate) can be configured, so that the measurement of the RF load impedance will occur more frequently. If the portable radio is not moving, for example when the radio stays in the holster, then a longer countdown timer value (low sampling rate) can be configured, so that measurements of the RE load impedance can take place less frequently.

To determine changes in RSSI to use as a basis for determining the countdown timer value, the controller (224) configures the RF switch (208) to couple the RF load to the LMR receive circuit and measure the difference in RSSI for over the air receive signals. For example, the RSSI is determined by receiving a first LMR frequency signal from over-the-air using the LMR receive circuit; determining a first receive signal strength indicator (RSSI) value based on the received LMR frequency signal; receiving a second LMR frequency signal from over-the-air using the LMR receive circuit; determining a second RSSI value based on the received LMR frequency signal; and determining a difference value between first and second RSSI values. The controller then determines a countdown counter value to trigger the RF load impedance measurement. Again, the controller will configure a lower timer countdown value (higher sampling rate) when the RSSI difference in value is high, and will configure a higher timer countdown value (a lower sampling rate) when the RSSI difference in value is low.

The combination of motion and RSSI can be used for improved accuracy. Accordingly, detecting changes in either motion and/or RSSI 402 can be used as a basis to determine and set the countdown timer at 404, 406 for triggering the RE load impedance measurement Returning to method 400 at 408, once the countdown timer has timed out, the method can proceed to 410 to determine a suitable LMR state within which to perform the RF load impedance measurement. The RF load impedance measurement will be performed during the suitable LMR state.

The suitable LMR states may include, (1) idle mode, analog mode battery save or analog mode non-Rx scanning states; a transmit time-division multiple access (TDMA) off-slot state; or (3) receive TDMA off-slot state, as these are all LMR states which are suitable for performing the impedance measurement. A description of each of these states follows next.

The idle mode, analog battery saver mode or analog non-receive scanning mode are modes where portable radio is not performing any LMR receiving or transmitting activities. When a Push-to-Talk (PTT) command is not received (for example, PTT button is not actuated), the portable radio will periodically enter the idle/battery save/non-receive scan state and turn off at least the LMR receive circuit (214) to save battery life (reduce battery current consumption). When the portable radio is out of this idle/battery save/non-receive scan state, the LMR receive circuit (214) is turned back on to enter receive scan mode to scan if there is any receiving RF signal on the channel frequency to which the portable radio is programmed.

The transmit TDMA off-slot state occurs when the radio is turned to a digital channel frequency, for example a digital mobile radio (DMR) channel, and the portable radio will operate in TDMA mode. When the PTT button is actuated in a digital channel (digital transmit mode), the portable radio will periodically (for example, every 60 ms) turn on (for example, for 30 ms) and turn off (for example, for 30 ms) the LMR transmit circuit (212) following the TDMA protocol. The 30 ms turn off state during digital transmit mode is the transmit TDMA off-slot state.

The receive TDMA off-slot state occurs when the PTT button is not actuated in a digital channel (digital receive scan mode), and the radio will periodically turn on the LMR receive circuit (214) to scan if there is any receiving RF channel frequency signal. The portable radio will go into digital receiving mode when there is RF channel frequency signal detected, and periodically (for example, every 60 ms) turn on (for example, for 30 ms) and turn off (for example, for 30 ms) the LMR receive circuit (214) following TDMA protocol. The 30 ms turn off state during digital receive mode is the receive TDMA off-slot.

The states (1), (2), and (3) when the LMR transmit and receive circuits (212, 214) are turned off, are states that do not incur interference from external or internal signals, thereby negating interference to the impedance detection circuit (306). These off-slots states thus provide the suitable states during which to perform RF load impedance measurement. In other words, the impedance measurements are only performed after the countdown timer has timed out and are only performed during the suitable states of transmit TDMA off-slot and/or receive TDMA off-slot.

To perform the impedance measurement (for example, during the off-slot state), the controller first configures the RF switch (208), to connect the RF load to the Wheatstone bridge (210) at 412. Once connected, the method moves to 414 where the radio controller (224) is configured to trigger the sweep generator (216) to generate a swept RF signal (with LMR channel frequency (Fc) of operation as the center frequency of the frequency sweep) to the Wheatstone bridge (210) through bypassed matching circuitry to the RF load. The method continues at 416 by calculating an impedance (Z) of the RF load and determining impedance location on a Smith Chart. At 418, the type of RF load is determined based on the load profile provided by the impedance calculation and impedance location on Smith Chart. The load profile can, for example, comprise a plurality of impedance locations of the plurality of RF swept frequencies on the Smith Chart. The RF load impedance measurement and S11 may indicate, for example, one of: a wideband load 420 maintaining the bypass of matching components 422; an expected type of antenna 424 or a wrong antenna, triggering an alert to the user of the wrong antenna at 426; an expected antenna that has become faulty 428, triggering an alert to the user or CAD administrator of the faulty antenna condition at 430; or an expected antenna with an impedance measurement indicating a non-optimum tuning condition 432, triggering tuning of the matching components at 436.

When the RF load is determined to be equipment (wideband load), then the RF bypass of the matching circuitry (20) is maintained. Depending on the type of RF load, the matching circuitry may continue to be bypassed (for equipment load, 420) or the matching circuit (206) be configured for an antenna load when an antenna load is determined. In one example, when an equipment (wideband load) is initially connected to the radio (via RF port 202), the motion sensor will detect a drastic change initially (when the user is connecting the radio to the equipment) and thus the radio will keep checking the RF load impedance more frequently (e.g. every 40 ms by setting a lower countdown value to the timer) (higher sampling rate) and detect the RF load has changed to wideband load. After the equipment is connected and stays in static condition, the motion sensor will detect the static condition (no change on motion sensor data), and thus will measure the RF load impedance less frequently (e.g. every 800 ms by setting a higher countdown value to the timer) (lower sampling rate) to save controller 224 computing resource and current consumption. Minimum and maximum sampling rates (countdown timer values) can be set to measure if there is a change to the RF load. The sampling rate can be adjusted within these min/max ranges based on the motion sensor and/or RSSI change.

The configuration of the matching circuit (206) for an antenna load is achieved by performing another frequency sweep, through the bridge (210), to re-calculate the impedance of the RF load together with a newly configured matching circuit (206), and then a repeat of the sweep is made with the newly configured matching circuit to achieve an impedance that falls within a 50-ohm threshold for the identified antenna. If no such matching is achievable, then a plurality of different indicators can be provided to the user to indicate a problem with the antenna (e.g. faulty antenna, broken antenna, wrong antenna), as described next.

Once the type of RF load is verified and triggers, tuning, if any, are appropriately taken, the RF switch (208) is then configured to return back to a transmit (TX) or receive (RX) path at 436. The method returns to 402 for another cycle.

The method 400 allows for the continued use of the portable radio even with a wrong antenna 426 (for example, the antenna may be wrong for a particular region or task assignment) or a faulty antenna 428 (for example, the antenna may be broken), thereby ensuring communication is maintained, while the user seeks out a correct antenna (such as for a particular assignment) or non-faulty antenna (for example: from another user, stored within an emergency vehicle, a service shop or carried as a spare or other source).

Figure 5:
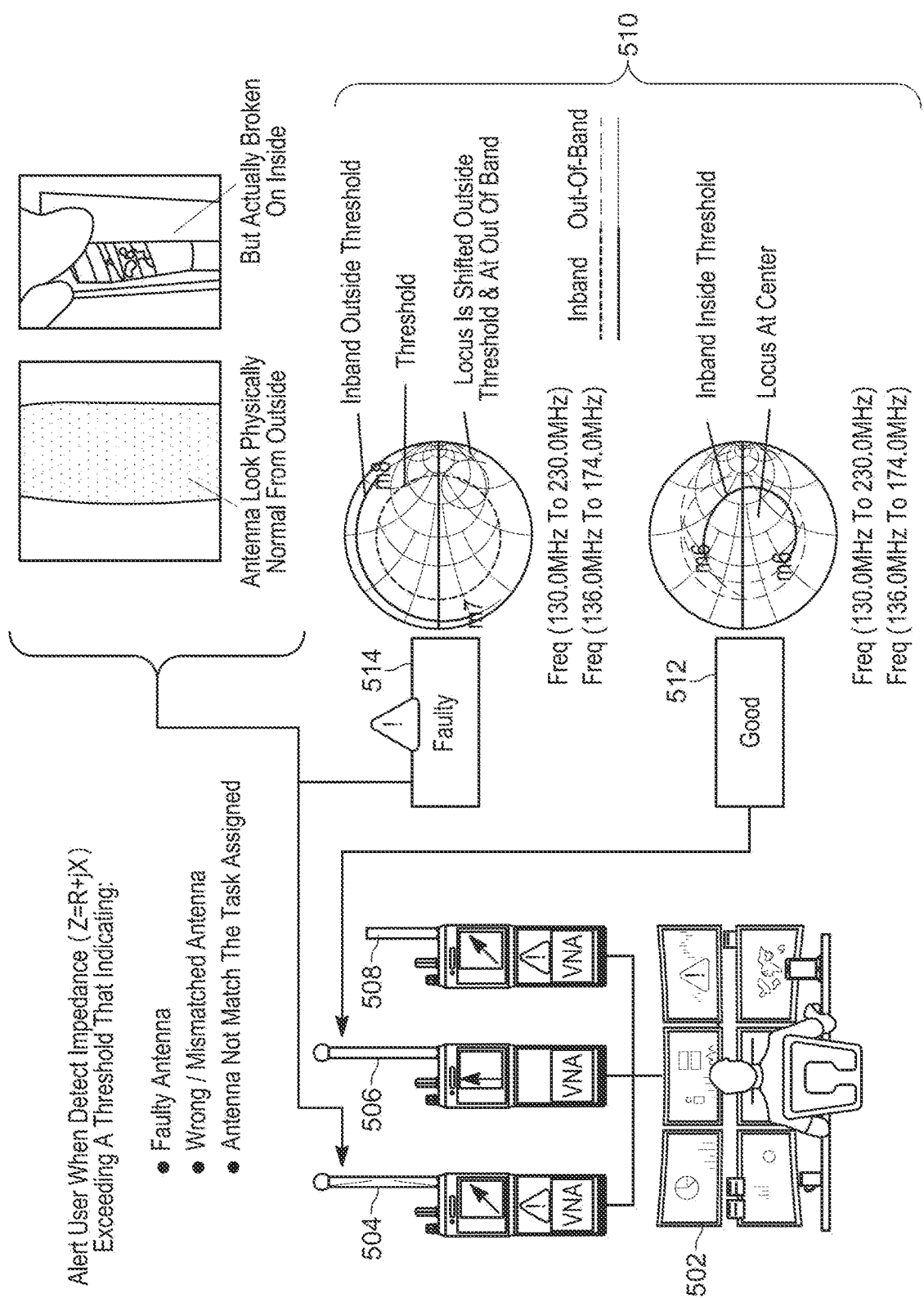
FIG. 5 is a communication system operating in accordance with some embodiments.

FIG. 5 is a communication system 500 operating in accordance with some embodiments. The communication system 500 includes a plurality of portable radios 504, 506, 508 each having an external removable antenna attached thereto, and each portable radio includes the RF load detection, impedance measurement, and radio configuration described in the previous embodiments. The communication system 500 further includes a computer aided dispatch (CAD) station 502 which may monitor the plurality of portable radios 504, 506, 508 operating in the field and assign dispatch tickets for various incidents.

In this embodiment, each portable radio measures its RF load impedance and has determined that the RF load of each radio 504, 506, and 508 is an antenna load, in the manner previously described. The portable radios may report their respective antenna impedance measurements to the CAD center 502. This impedance measurement may indicate a faulty antenna, a mismatched antenna, or an antenna not appropriate for an assigned user task dispatched by CAD station 502.

The Smith Charts shown at 510 are provided to compare an example of detection of good antenna operation 512 and poor antenna operation 514. At 512, a frequency sweep of 130-230 MHZ shows that the antenna impedance of radio 506 at the radio operating channel frequency (in-band frequency) falls inside an antenna health threshold—with locus at center of chart, indicative of an antenna that supports operation within the expected LMR frequency range. However, the impedance Z of radio 504 exceeds the antenna health threshold (i.e. antenna impedance outside of an antenna health threshold) as shown at Smith Chart 514. Radio 508 is attached with a stubby (shorter) antenna and thus impedance of the antenna is measured to determine if the stubby antenna is optimum for the talkgroup channel frequency programmed to the portable radio 508 or if the stubby antenna capable of supporting the required communication range based on a task assignment by the CAD station 502 to the user of portable radio 508.

Detection of a faulty antenna, results in the controller of the portable radio generating a faulty antenna alert through a portable radio display, LED indicator, or audible alert from the portable radio. Detection of a mismatched antenna will result in automatic tuning of the radio's matching circuitry.

Narrower bandwidth and lower efficiency occur with shorter antennas. If the assigned task would be better performed using a longer antenna, then the CAD station 502 will send a message to portable radio 508 to change antennas. In this example, determining if the antenna is a shorter antenna or a longer antenna can be determined from the antenna impedance, location of the antenna impedance on the Smith Chart across the radio operating channel frequencies, and/or S11 value of the antenna.

A longer antenna will have antenna impedance of a wider range of frequency having value close to 50-ohm (due to wider bandwidth) compared to a shorter antenna. A longer antenna will have antenna impedance location of a wider range of frequency located near to the center of the Smith Chart compared to a shorter antenna. A longer antenna will have S11 value of wider range of frequency having lower value compared to shorter antenna. A longer or shorter antenna (or any other type of antenna) can also be identified by comparing the antenna impedance over the swept frequency to a predetermined and prestored antenna profile in the memory of the portable radio. Thus, in one example, if a task of "putting out wildfire in a jungle" is assigned by CAD station 502 to a portable radio that is measured to be attached with a short antenna, when the portable radio sending the antenna impedance information indicating a short antenna impedance over the air (for example, through LMR data signal, WIFI signal, LTE signal) to CAD station 502, the CAD station will determine from a look-up table that the task of "putting out wildfire in a jungle" needs a longer whip antenna that support a longer communication range, instead of the currently attached short antenna. Responding to this determination, the CAD station 502 will send the portable radio an alert message to change to the longer whip antenna.

Figure 6:
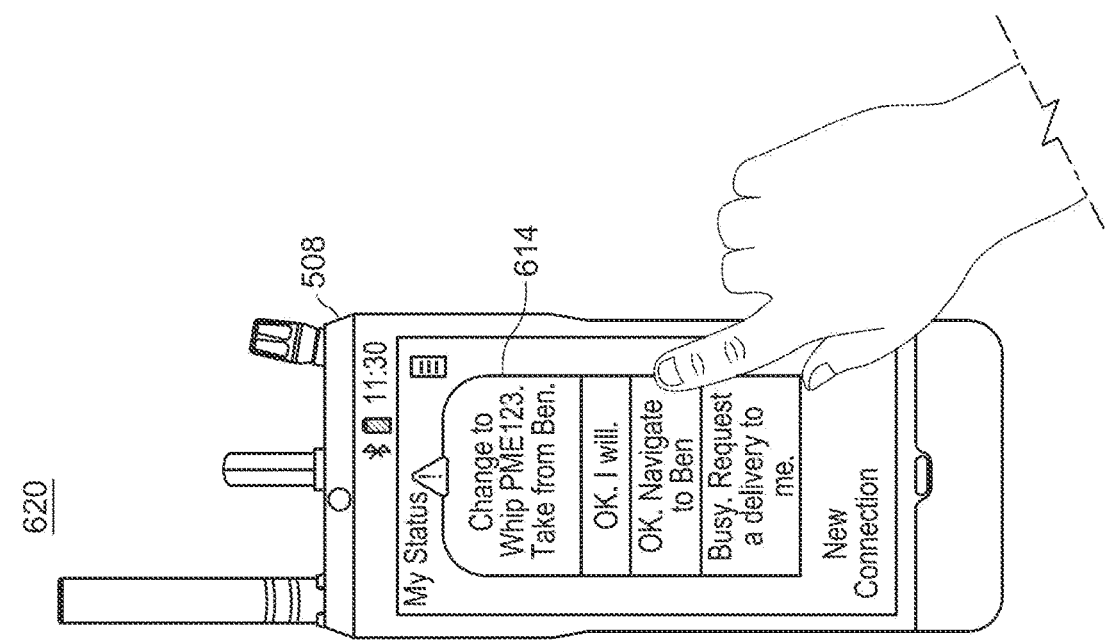
FIG. 6 is a flowchart for a computer aided dispatch (CAD) station to remotely configure one or more portable radios based on the RF load detection in accordance with some embodiments.
Figure 6:
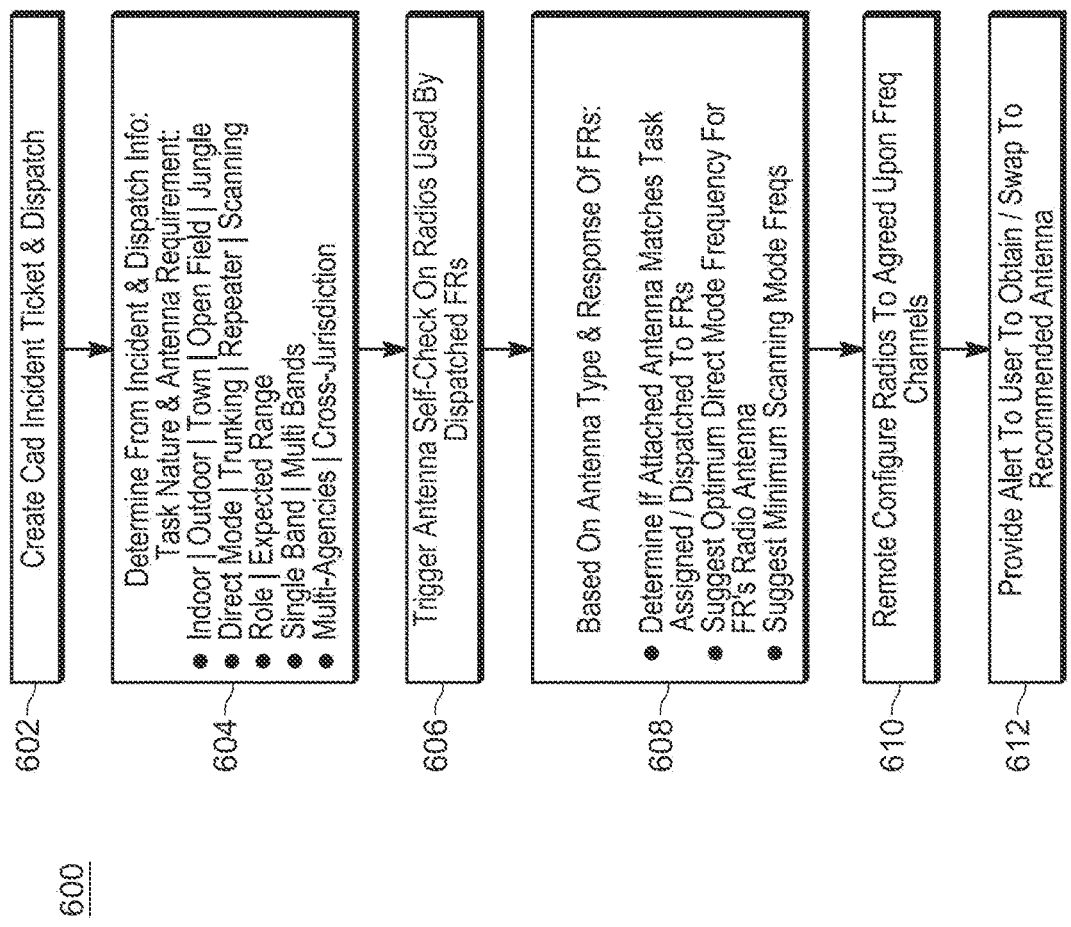

FIG. 6 is a flowchart 600 for the computer aided dispatch (CAD) station 502 of FIG. 5 to remotely configure one or more portable radios 620 based on the RF load detection in accordance with some embodiments. Beginning at 602 the CAD station creates an incident ticket and dispatches the ticket to a plurality of first responder (FR) portable radios 620, shown as portable radio 508.

At 604, the CAD station 502 determines, based on the incident type or task type and dispatch information, and the antenna communication range requirement of a portable radio. For example the incident type may be a public safety event, such as an emergency environmental event (e.g. wildfire, earthquake, tornado, to name a few) or the task type may be based on a first responder's task assignment, for example, patrol, pursuit, and/or investigation. The nature of the task associated with the incident type may require one or more types of first responders, such a police, firefighter, and or paramedics. The location type (indoor, outdoor, town, rural and size) of the incident is identified and entered by CAD operator or based on the incident address and incident area entered by the CAD operator.

The availability of radio infrastructure support, for example direct mode, trunking repeater, and/or scanning capability is identified by retrieving the infrastructure availability information from an infrastructure database that stores all the infrastructure information of a geographical area and if the dispatched user or dispatched agency has access or subscribed to the infrastructure. For example, if an incident area of a fire on a residential house is in a town area, the infrastructure database may indicate that there is trunking infrastructure available at that location address information keyed in by the CAD operator and the firefighter team dispatched by the CAD operator has already subscribed to the trunking service provided by the trunking infrastructure. In another example, if an incident area of a wildfire is in a jungle, the infrastructure database may indicate that there is no trunking infrastructure in the jungle and thus a direct mode communication (portable radio directly transmit LMR signal to other portable radios without going through any infrastructure) is needed by the dispatched firefighter team to the jungle.

Radio bands supported by each portable radio, for example, single band or multi-band, as well as bands needed to cover cross-jurisdictional incidents, and/or radio bands needed for multiple agencies being dispatched to an incident may be identified and displayed. The CAD stations 502 and the connected server and database will have the information of all public safety agencies that are available to be dispatched by the CAD operator when an incident happens. The information of the public safety agencies including the name of first responder, the radio ID (identifier number) that is associated with each first responder name, and the radio ID is associated with a radio model that determines the bands supported by that particular radio model (for example, a VHF radio, a VHF and UHF radio or all bands (VHF, UHF and 800/900 MHz radio).

In one example, the antenna model (e.g. UHF whip antenna model, UHF stubby antenna model) and antenna profile associated with each antenna model is available in the database and associated with each radio mode. In one example, the talkgroup information (talkgroup channel frequency) is stored in the database and associated with each radio. When a CAD operator performs a dispatch for an incident, the CAD operator will select (through CAD station 502 display and user interface) who to be dispatched to the incident. The dispatch information selected by the CAD operator including, type of first responder or agency (CAD stations can automatically select the name of available first responder to dispatch based on the first responder type and agency type selected), who (names) of first responder (CAD station can automatically retrieve the radio ID that associated to the name of first responder), and based on radio ID, other associated information to the radio ID can be retrieved (for example, antenna impedance data, radio model, bands supported by the radio model, antenna models supported, antenna profile of the antenna model supported, and talkgroup channel frequency programmed in each radio).

The following Table is provided as an example of what may be displayed at the CAD station 502 of FIG. 5 to facilitate ticket and dispatch of the ticket to one or more FR radios 620. The Table facilitates antenna recommendation based on a variety of contextual factors, such as those previously described for example, incident type, first responder (FR) type, location/incident area, infrastructure support type and availability, radio band support to name a few and which result in an antenna recommendation (final column of Table). The Table is intended as an illustrative example and the parameters can be adjusted as appropriate to public safety incident information and the available infrastructure and available radio support.

| Incident Type/ Task Type | FR | Location/ Area | Infrastructure Support | Radio Band Support | Antenna Recommendation |
|---|---|---|---|---|---|
| Patrol | Police | Town | Trunking | VHF narrowband | Stubby Antenna |
| Robber Pursuit | Police | Rural (34 km²) | Direct Mode | VHF | Whip Antenna |
| Wildfire | Firefighter | Jungle (25 km²) | Direct Mode | UHF1 | UHF Whip antenna |
| Wildfire | Firefighter | Jungle (25 km²) | Repeater | UHF2 | UHF2 Stubby Antenna |
| Earthquake | Firefighter Police Paramedic | Town (3 km²) | Direct Mode (infra down) (scanning) | UHF1 (firefighter) UHF2 (police) 800 MHz (paramedic) | UHF full band + 8/900 MHz Whip Antenna |
| Investigation | Police (different agencies) | Cross-jurisdiction | Direct Mode (scanning) | VHF 136 MHz (jurisdiction 1) VHF 174 MHz (jurisdiction 2) | VHF Full Band Whip Antenna |

As mentioned earlier, when CAD operator created an incident ticket or task assignment ticket, CAD operator will key in incident type/task type information, incident location and area information (for example, key in address information and/or select an area on a mapping user interface), and select what (and how many) are the first responder type/agency type needed (CAD stations 502 can also automatically propose the type of first responder and number of first responder needed based on the incident type/task type, for example, if a fire incident of a residential house is keyed in, 5 firefighters, 3 police, and 2 paramedic officers are automatically proposed to CAD operator). The infrastructure information availability information is retrieved from the database based on the area selected and/or address keyed in by CAD operator. Based on the name of the first responder dispatched or selected, associated information, for example, radio ID info, radio model info, band supported by each model, talkgroup channel programmed in each radio, antenna model supported, antenna profile associated to each model, antenna impedance data measured and received from each radio will be retrieved.

Furthermore, when multiple different types of first responders from multiple agencies are assigned to the same incident, there may be a need to enable cross communication among the different types of first responders. For example, if a police officer (who carries portable radio that is programmed with talkgroup channel frequency 403 MHz) and a firefighter (who carries portable radio that is programmed with talkgroup channel frequency 527 Mhz) is assigned to the same incident, there may be a need for both the portable radios of the police and firefighter to perform a receive scan on both 403 MHz and 527 Mhz so that they can listen to both talkgroup channels for cooperation at the incident scene. If there is no trunking infrastructure available at the scene, an antenna is needed that can cover both channel frequencies (403 MHz and 527 MHz) at an acceptable talk range (talk range requirement based on incident area info). This leads to an antenna requirement for a longer whip UHF antenna that able to cover both channel frequencies (403 MHz and 527 Mhz). For this example, if trunking infrastructure is available, the antenna requirement need only cover one channel frequency and thus the antenna requirement is just a shorter 403 MHz stubby antenna for the police and a shorter 527 MHz stubby antenna for the firefighter.

The need for cross-communication among different teams, different agencies, and different jurisdictions also includes cross-bands communication, for example, the need for VHF radio communicate to UHF radio through trunking infrastructure, or the need to re-program (remote programming over-the-air) of one portable radio (radio and antenna that support both VHF and UHF bands) from VHF to UHF in order to talk to another portable radio that only able to operate at UHF band.

Based on the task nature, incident location and area, infrastructure availability information, a communication range requirement (or LMR talk range requirement) may be determined. Based on the LMR talk range requirement, the need for cross-communication, and the band supported by the radio, an antenna requirement and recommendation is determined.

In one example (e.g. row 6 of the Table), the CAD operator creates an incident ticket of for an incident type being an earthquake, and selects the impacted incident area (3 km2 area in a town that suffers earthquake) on a mapping application on CAD station user interface. The CAD station automatically retrieve from a predetermined look-up table stored in a server that indicates that an earthquake of 3 km2 area needs a dispatch of 30 firefighter, 10 police and 20 paramedic officers, auto populate the names of determined first responder from the nearest agencies, and determine a need for cross-communication among the firefighters, police, and paramedic officers.

Infrastructure information retrieved from the CAD server that communicates real-time to infrastructure at the earthquake area may indicate that the trunking infrastructure is down (malfunction due to the earthquake) and thus a direct mode with receive scanning is needed. All other required information, for example, radio ID, talkgroup channel frequency information, radio model, radio transmitter power information (based on the radio model and configuration), radio supported band information, supported antenna model, antenna impedance data, antenna connector type (ferrule or SMA connector) is retrieved from database, based on the name of first responder in the dispatch list. In this example, radios of firefighters are programmed to operate in UHF1 channel frequency, radios of police are programmed to operate in UHF2 channel frequency, and radios of paramedic officers are programmed to operate in 800 MHz band frequency. All of the radios are of a model that is able to support UHF1, UHF2 and 800 MHz bands. Thus, the requirement and recommendation of the antenna needed for all the radios is an antenna that supports UHF full band and 8/900 MHz, and the antenna should be be a whip antenna as the LMR talk range of 3 km2 has exceeded a predetermined threshold of LMR talk range supportable by a stubby antenna (for example, stubby antenna can only support up to LMR 2.5 km2 talk range). In this example, all the radios dispatched will be remotely triggered to measure respective antenna impedance on each radio. The measured antenna impedance information of the various radios are sent to CAD station 502 so that any violation of antenna requirement of a dispatched radio will result in sending an alert notification to the dispatched radio to perform a change of antenna to an antenna that does fulfill the antenna requirement and recommendation.

Moving to 606 of flowchart 600, the CAD station (of FIG. 5) sends a trigger to the dispatched first responder portable radios, triggering each dispatched FR radio to perform an antenna self-check. Based on the self-check responses received back from the plurality of FR portable radios to the CAD station, the CAD station determines at 608, if the currently attached antenna for each dispatched FR portable radio is acceptable for the assigned task. For dispatched FR portable radios determined to have a suitable antenna for the assigned task, optimized operational channel frequencies and receive scanning mode frequencies can be determined by the CAD station. For example, a police portable radio (that is dispatched to an incident) is programmed with talkgroup channel frequency of 405 MHz. Another firefighter portable radio (that is also dispatched to the same incident) is programmed with talkgroup channel frequency of 500 Mhz. Both radios are remotely instructed by CAD station 502 to perform antenna impedance measurement and send the antenna impedance data to CAD station 502 via over-the-air wireless communication. CAD station 502 receives the antenna impedance data from both the radios, analyzes and determines the type of antenna attached to their radios. CAD station 502 determines, from the antenna impedance data from police portable radio, that police portable radio is attached with a stubby antenna that can only support from 403 MHz to 410 MHz with LMR talk range of 4 km (at channel frequency higher than 410 MHz, the LMR talk range is less than 4 km). CAD station 502 also determines, from the antenna impedance data from firefighter portable radio, that firefighter portable radio is attached with a whip antenna that can support full UHF band from 403 MHz to 527 MHz with LMR talk range of 5 km. CAD stations 502 based on the LMR talk range required for the incident of 4 km, and the analysis that firefighter portable radio has an antenna that can support 405 MHz channel frequency that currently programmed in police portable radio; and police portable radio has an antenna that cannot support 500 MHz channel frequency that programmed in firefighter portable radio, determine that the common direct mode channel frequency that should be used by both police and firefighter portable radio is 405 MHz. Thus, CAD station 502 recommends to the CAD operator and remotely program (over-the-air through wireless communication) the firefighter radio to 405 MHz in its talkgroup channel frequency so that both police portable radio and firefighter portable radio can talk together using the common 405 MHz channel frequency while still able to maintain the direct mode LMR talk range required by the incident task. In another example, if a common direct mode channel frequency that meets the required LMR talk range is not available based on the antenna impedance data received from all the dispatched portable radios, then a recommendation to change antenna to a suitable one will need to be sent to certain portable radios so that a common direct mode channel frequency is available. Furthermore, the number of receive scanning frequencies of all the dispatched portable radios can also be optimized, such that a minimum number of receive scanning frequencies is achieved by re-programming talkgroup channel frequency of certain radios to be the same as some other radios so that less receive scanning frequencies is needed, as long as the antenna impedance data receiving from those radios indicate the LMR talk range requirement for the task assigned is still fulfilled after the re-program of talkgroup channel frequency. At 610, remote configuration of all FR radios to the optimized agreed upon channels takes place.

Based on the antenna recommendation and the self-check response, the CAD station 502 may send an alert 612 to one or more of the portable FR radios to change the currently attached radio antenna to the recommended antenna (for example, when a common direct mode channel frequencies is not available based on the antenna impedance data, or when a reprogramming of the one or more portable FR radios to the common talkgroup channel frequency is not desired, or when a antenna change is more desirable by the user compared to reprogramming of the one or more portable FR radios to the common talkgroup channel). In some examples, the antenna change recommendation is due to a detection of faulty antenna, wrong antenna attached (for example, broken antenna, antenna with wrong frequency band, a ferrule antenna is attached to radio with SMA connector), or the antenna cannot fulfill the LMR talk range required by the assigned task. The CAD station may further send selectable options to the portable RF radio to facilitate acquiring the recommended antenna (such as from another user, known spare carried by current user, taken from emergency vehicle or other source).

At 620, an example of the portable radio 508 having the RF Load detection capability as previously described. In accordance with this embodiment, the portable radio 508 further includes a user interface touch display 614. The portable radio 508 has been triggered by the CAD system to perform the antenna self-check (at 606) with the result being sent to the CAD station, and a determination has been made by the CAD station (at 608) that the antenna currently attached to the radio 508 is not suitable to the assigned task. The user interface touch display 614 is provided with an alert (at 612) recommending that the antenna be changed along with user-selectable options to respond to the alert. The user may confirm or decline the changing of the antenna. The interface may further provide user selectable options to obtain the suitable antenna (for example, take from his spare antenna in carry bag or emergency vehicle, take or swap antenna with another person with radio providing navigation interface (like GOOGLE Map) to the said person, or to have the antenna delivered to the user. An antenna swap is recommended to the user when radio determines that the antenna exchange between the two users will still enable portable radios from both users to fulfill the LMR talk range required for the different task assigned to each of them. One user may have a task that needs a longer talk range (for example, firefighter who enters the wildfire jungle), while another user may have a task that needs a shorter talk range (for example, paramedic officers who provide medical treatment at the entrance of the jungle). In this example, if the firefighter portable radio is attached with a stubby antenna that have shorter LMR talk range, while the paramedic portable radio is attached with whip antenna that have longer LMR talk range, an antenna swap recommendation would be provided to both the firefighter and paramedic officer as both will still able to fulfill the LMR talk range required based on their task and role after the antenna swap.

As described earlier, the CAD station 502 may remotely reprogram a portable radio to another talkgroup channel frequency. In some examples, the portable may receive instruction to change to another talkgroup channel frequency, via a frequency knob change. In another example, CAD operator may change a task assigned to a first responder and thus result in an instruction to change to another frequency channel based on needs of the newly assigned task (the newly assigned task require the portable radio to operate at another talkgroup to communicate with a new team associated to the newly assigned task). Thus, a radio may receive instructions to change to a different talkgroup channel frequency, and in this case, a recommendation to change to a suitable antenna for that newly programmed or changed talkgroup. For example, a portable radio 200 is operating at a first talkgroup channel frequency, then the portable radio may receive an instruction to configure the portable radio to operate at a second talkgroup channel at a second LMR RF frequency. If the second LMR frequency range is out of the frequency range supported by the currently attached antenna, the portable radio may determine a second type of antenna that supports the second LMR RF frequency based on a look-up table stored in the radio's controller or based on the look up Table of the public safety CAD center. The portable radio user interface's touch display is then configured to provide recommendations to switch to the second type of antenna. The instruction to configure the portable radio to operate at the second talkgroup channel may be received in response to one of: a frequency knob change to a position indicating the second talkgroup channel; an over-the-air transmission of an assigned task, wherein the assigned task is associated to a second talkgroup channel based on a look-up table stored in the controller, or an over-the-air transmission of a talkgroup channel change instruction by a public safety dispatch center (for example, CAD station 502) to change to the second talkgroup channel. For example, a portable radio performs a self-check on antenna impedance and determines that the connected antenna is a stubby antenna that supports 403 MHz to 420 MHz and the radio is at a talkgroup channel frequency of 410 MHz. When the portable radio is instructed to change to another frequency 520 MHz (for example, when user change frequency knob of the radio to another channel that operating at 520 MHz, or when receive remote instruction from CAD station 502 to change channel frequency to 520 MHz), the portable radio determine that frequency 520 MHz is out of the antenna support frequency range, thus determine another stubby antenna that support 500 MHz to 527 MHz is supporting new channel frequency of 520 MHz (based on a look-up table stored in controller), thus recommend to the user to change to the new stubby antenna that support 500 MHz to 527 MHz, so that the radio can operates at the new channel frequency.

The CAD center may also auto-assign a talkgroup frequency to the radio, based on the antenna attached to the radio and the task assigned. The auto-assignment may be achieved by having the portable radio transmit over-the-air the information pertaining to the antenna impedance to the public safety CAD center (the antenna information being determined using the antenna self check as previously described). The portable radio then receives an over-the-air transmission of a talkgroup channel change instruction from the public safety CAD center to change to a second talkgroup channel. The second talkgroup channel is determined based on antenna type, a task assigned to the portable radio, and a talk range requirement associated with the task assigned. The second talkgroup channel is operating on a second channel frequency associated with the task assigned, the second channel frequency is supported by the type of antenna, and the talk range requirement is met at the second channel frequency based on the type of antenna. For example, a portable radio is operating at channel frequency of 527 MHz and performs a self-check on the connected antenna impedance (for example, antenna impedance of a stubby antenna supporting 403 MHz to 420 MHz) and sends the impedance data via over-the-air communication (for example, WIFI signal, LTE signal or LMR signal) to the CAD station 502. CAD station determine a suitable channel frequency (for example, 410 MHz) for the portable radio based on 410 MHz is the optimum point of the connected antenna that enable the portable radio to be able to have a talk range of 5 KM that fulfill the required LMR talk range of 4.5 KM based on assigned task of putting off wildfire that has spread through 4.5 KM in the jungle. CAD station 502 may then send instructions to the portable radio to change to the 410 MHz channel frequency. The portable radio will change the channel frequency from 527 MHz to 410 MHz accordingly when receiving the channel change instruction from the CAD station 502.

In some embodiments, the portable radio 508 may receives a new task and talk range requirement from the CAD center which necessitates a change to a new suitable antenna. This can be accomplished by determining the current talkgroup channel and LMR channel frequency of the portable radio, and receiving, at the portable radio, an over-the-air transmission of a talk range requirement from the CAD center. The talk range requirement may be based on an assigned task, an incident type, a role of a public safety officer, and/or a geo-location of the incident. If a determination is made that the current type of antenna cannot support the talk range requirement at the determined LMR channel frequency, then the CAD center sends a recommendation to the portable radio for display at the user interface touch display 614 recommending to change to a second antenna with suitable type of impedance to support the talk range requirement. For example, a portable radio is connected with a stubby antenna that supports a LMR talk range of 3 KM. This 3 KM LMR talk range is suitable for a current task (patrolling at town), assigned to this portable radio. The portable radio then receive a new talk range requirement, said 5 KM, from the CAD station 502, as now a new task (assisting in an flood incident where flood incident cover up to 5 KM in area) is assigned to the portable radio. The portable radio determine that the stubby antenna that can only support up to 3 KM LMR talk range is not suitable to be use in the flood incident that require up to 5 KM LMR talk range and thus recommends the user to change to a whip antenna that can support up to 5 KM LMR talk range at the current talkgroup channel frequency.

In some embodiments a recommendation to swap antennas with another user/officer may be made to better perform a task. For example, the portable radio 508 may receive an over-the-air transmission, from the CAD center including location information of a second portable radio, a second talk range requirement associated with the second portable radio, and antenna information for a second antenna attached to the second portable radio. The portable radio determines that the second antenna is of a same type as that of the portable radio and that the type of antenna attached to the portable radio can meet the second talk range requirement, then the portable radio can be configured to display a recommendation to swap the antenna attached on the portable radio to the second antenna from the second portable radio; and the location information of the second portable radio. Swapping the antennas allows both portable radios to operate, yet beneficially allows the identified portable radio in need of improved performance for a particular task to obtain the needed antenna in the field quickly, without having to return to a station. For example, a first portable radio receives from CAD station 502 a antenna request information with an requested antenna requirement of 5 KM LMR talk range needed by a second portable radio (for example, after the second portable radio performs a self-check on its antenna and sends the antenna information to CAD station 502 and the CAD station 502 determine that the second portable radio require a whip antenna that able to provide a required 5 KM LMR talk range) and the antenna information of the stubby antenna (that only able to support up to 3 KM LMR talk range) that currently attached on the second portable radio. The first portable radio then determines that its whip antenna is able to support the second portable radio antenna requirement of 5 KM and at the same time the first portable radio does not need such a long talk range provided by its current whip antenna (first portable radio only need 1 KM LMR talk range based on its task assigned, which can be supported by the second radio stubby antenna). Thus, a swap antenna recommendation is provided to the users of both the first and second portable radios.

The system of FIG. 6 further allows for a recommendation for the radios to move to a direct mode channel frequency that can be used by all radios with different antenna types. This direct mode reprogramming be accomplished by the determination of the second talkgroup channel being further based on, for example, a second type of antenna attached on a second portable radio that is operating on the same talkgroup with the portable radio; a second task assigned associated to the second portable radio, a second talk range requirement associated with the second task assigned, wherein the second talkgroup channel is operating on a second channel frequency associated with the task assigned and the second task assigned. The second channel frequency is supported by both the first type of antenna and the second type of antenna, and both the first talk range requirement and the second talk range requirement are met at the second channel frequency based on the type of antenna and the second type of antenna. Thus, in this example, both the first portable radio and the second portable radio are able to communicate to each other based on a common direct mode frequency that is suitable for both portable radios (suitable to their respective assigned task). For example, a first portable radio and a second portable radio operate on a 430 MHz channel frequency. Due to the wildfire medical rescue task assigned to the first portable radio, the required LMR talk range of the first portable radio is 5 KM. Due to the wildfire fire rescue task assigned to the second portable radio, the required LMR talk range of the second portable radio is 5 KM. Both the first and second send their antenna impedance information to CAD station 502. CAD station 502 analyzes the antenna impedance information and determines that a channel frequency of 500 MHz is a better channel frequency for both portable radios to operate on, because frequency of 500 MHz will enable the fulfillment of LMR talk range of 5 KM of both portable radios. In this case, although the first portable radio is attached with a stubby antenna that has narrower bandwidth but optimum at 500 MHz (poor at 430 MHz and not able to achieve 5 KM LMR talk range); and second portable radio is attached is whip antenna that can cover from 403 MHz to 527 MHz, both the portable radio can now achieving the require talk range of 5 KM after both switching together to a new channel frequency of 500 MHz. This is a better common direct mode channel frequency because the first portable radio would not be able to achieve LMR talk range of 5 KM if both the radios stay at 430 MHz.

Accordingly, there has been provided a portable radio providing radio frequency (RF) load detection, identification, and configuration. The portable radio may advantageously perform self-diagnostics for the antenna upon initial power up as well as periodic checks during operation in alignment with National Fire Protection Association (NFPA) standard requirements. The portable radio operating in accordance with the embodiments is able to minimize and address mismatched, faulty and/or wrong antenna issues. Wrong antenna could include scenarios where a different band stubby antenna is attached (different band from programmed talkgroup channel frequency), a mismatch type of RF load connector 202 of a portable radio 200 to antenna RF load connector (for example, a ferrule antenna is connected to portable radio with SMA connector, a SMA antenna is connected to a portable radio with ferrule connector). The antenna can beneficially be replaced or changed out (longer to shorter antenna/shorter to longer antenna), as the matching circuitry will retune for the interchanged antenna.

The embodiments provide improvements over known comparator and/or self-quieting spur approaches. For example, the comparator approach, which detects a divided voltage when an antenna with a built-in grounded resistor is attached, cannot accommodate a ferrule antenna, as a ferrule antenna has no ground for resistive comparator detection. The embodiments are enabled without the need for a built-in resistor in the antenna. The portable radio of the embodiments is beneficially able to determine antenna type, as opposed to past approaches which only detect antenna connection. The past comparator approach cannot detect an internally broken antenna and/or impedance shift. The portable radio operating in accordance with the embodiments provides reliable detection and identification of an RF load and is thus superior to the self-quieting spur detection approach which is prone to false detections and which cannot determine the actual impedance of the RF load. The approaches provided by the various embodiments negates any need to use a LMR transmit circuit carrier to detect the antenna impedance, which in the past would carry over poor performance until adjustments could be made, only after the transmission. LMR radio cannot dynamically tune the matching circuit while LMR transmit circuit is actively transmitting because any matching circuit impedance change will cause spurious response to the LMR transmit circuit signal, and thus negate the possibility of using LMR transmit circuit signal to measure antenna impedance in LMR portable radio for antenna tuning purpose. Furthermore, LMR transmit circuit signals cannot be swept over a range of operating frequency as that would create unwanted spurious levels that fail LMR regulatory specification.

The (RF) load detection, identification, and tuning configuration of the embodiments are particularly advantageous to land mobile radio (LMR) radios which face challenges within an LMR system that are quite different from those of cellular type devices. For example, a portable cellular device does not generally have a removable antenna and thus has a known/predetermined antenna response. The cellular portable is able to rely on cellular base station feedback for antenna tuning and have multiple overlapping geographic cell towers that enable handoff to cells with stronger signals for antenna performance. These cellular approaches are not applicable to LMR portable operation and do not provide for the accommodation of a broadband load (e.g. RF frequency analysis equipment) in addition to the changing of antennas.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable radio, comprising:
   a radio frequency (RF) antenna port for connecting to a radio frequency (RF) load, wherein the RF load comprises a detachable and interchangeable antenna or a 50-ohm wideband equipment load;
   a tunable load matching circuit coupled to the RF antenna port;
   a radio frequency (RF) switch coupled to the tunable load matching circuit, a Wheatstone bridge,
   a land mobile radio (LMR) transmit circuit and LMR receive circuit;
      wherein, the tunable load matching circuit is switchable to couple to the Wheatstone bridge, via the RF switch, during non-transmit and non-receive states of LMR transmit circuit and LMR receive circuit for RF load impedance measurement;
   a frequency sweep generator coupled to a first mixer circuit and the Wheatstone bridge,
      the frequency sweep generator injecting an incident signal to the first mixer circuit and the Wheatstone bridge,
      the incident signal being a swept LMR RF signal that is derived based on a current talkgroup channel of the portable radio,
      wherein the incident signal is reflected by the Wheatstone bridge as a reflected signal that couples to a second mixer circuit;
      wherein the first mixer circuit and the second mixer circuit convert the incident signal and reflected signal into an incident mixed down signal and a reflected mixed down signal; and
   a controller receiving the incident and mixed down signals and generating complex signals,
      wherein the controller:
         configures tunable load matching circuit in order to present a RF bypass between the RF antenna port and the RF switch,
         measures the impedance of the RF load by calculating an impedance (Z), a resistance (R) and a reactance (X) from the complex signal, and
         identifies the RF load based on the measured RF load impedance; and
         configures the tunable load matching circuit based on the identified RF load.

2. The portable radio of claim 1, wherein the swept LMR RF signal is injected during at least one of: digital time-division multiple access (TDMA) transmit off-slot, TDMA receive off-slot, idle mode, analog battery saver mode or analog non-Rx scanning mode of LMR radio operation, thereby enabling impedance determination without presence of a transmit or receive signal.

3. The portable radio of claim 1, further comprising:
   a motion sensor to detect motion of portable radio, the detected motion being used to determine a sampling rate to perform the RF load impedance measurement, wherein the controller configures a higher sampling rate when motion of portable radio is high, and configures a lower sampling rate when motion of portable radio is low.

4. The portable radio of claim 1, wherein the swept LMR RF signal is synchronized with a current talkgroup channel of the portable radio, wherein the current talkgroup channel is within a start and stop frequency of the LMR RF sweeping frequency range.

5. The portable radio of claim 1, wherein the impedance determines one of the following conditions:
   a non-optimal antenna match;
   a faulty or broken antenna;
   a wideband 50-ohm equipment load;
   no antenna attached;
   a wrong antenna that operates at a frequency different from the current talkgroup channel; and
   a wrong antenna that operates at frequency within the current talkgroup channel but not at an optimum range suitable for current talkgroup operation.

6. The portable radio of claim 1, wherein the impedance is determined without a LMR transmit signal or a LMR receive signal,
   wherein during the impedance measurement
      the RF switch is switched away from LMR transmit circuit or LMR receive circuit and tunable antenna matching components are not coupled to either LMR transmit circuit or LMR receive circuit; and
   wherein after the impedance measurement
      the RF switch is switched back to LMR transmit circuit or LMR receive circuit and tunable antenna matching components are coupled back to either LMR transmit circuit or LMR receive circuit.

7. The portable radio of claim 1, wherein the tunable load matching circuit is configured to further provide a RF bypass to a LMR transmit circuit or LMR receive circuit path when a 50-ohm broadband equipment load is present at the antenna port.

8. The portable radio of claim 1, wherein the tunable load matching circuit is configured based on the identified impedance so that the tunable matching circuit presents as near as a 50-ohm load to the LMR transmit circuit or the LMR receive circuit.

9. The portable radio of claim 1, wherein both the incident and reflected mixed down signal are converted to an incident complex signal and a reflected complex signal with real and imaginary values by correlating the incident and reflected mixed down signal to a sine and a cosine reference signal that are in quadrature phase.

10. The portable radio of claim 9, wherein complex reflection coefficients are determined by mathematically complex dividing the reflected complex signal with incident complex signal.

11. The portable radio of claim 1, wherein the controller determines based on the resistance (R) and reactance (X) across the swept LMR RF signal:

a plurality of load profile locations on a Smith Chart; and identifies RF load type in response thereto.

12. Portable radio of claim 11, wherein the RF load type is one of:
    a wideband equipment load;
    a faulty antenna;
    a type of antenna that support within a LMR frequency range; and
    an antenna impedance outside of a 50-ohm threshold.

13. The portable radio of claim 1, wherein when the RF load is determined to be an antenna load that exceeds a 50-ohm threshold, the controller tunes the tunable load matching circuit to an impedance approaching 50-ohm.

14. The portable radio of claim 1, when the RF load is identified to be an antenna load, the method further comprising:
    receiving instruction to configure the portable radio to operate at a second talkgroup channel at a second LMR RF frequency;
    determining that the second LMR RF frequency is outside of the LMR frequency range that supported by the type of antenna;
    determine a second type of antenna that support the second LMR RF frequency based on a look-up table stored in the controller; and
    configure the display of the portable radio to provide recommendations to switch to the second type of antenna.

15. The portable radio of claim 14, wherein the instruction to configure the portable radio to operate at the second talkgroup channel is based on one of:
    frequency knob change to a position indicating the second talkgroup channel;
    over-the-air transmission of an assigned task, wherein the assigned task is associated to the second talkgroup channel based on a look-up table stored in the controller; and
    over-the-air transmission of a talkgroup channel change instruction by a public safety dispatch center to change to the second talkgroup channel.

16. The portable radio of claim 1, wherein when the RF load is identified to be an antenna load, the controller is further configured to:
    determine the current talkgroup channel and LMR channel frequency;
    receive over-the-air transmission of a talk range requirement;
    wherein the talk range requirement is based on a task assigned, an incident type, a role of public safety officer, and a geolocation of the incident; and
    determine the type of antenna cannot support the talk range requirement at the determined LMR channel frequency;
    display a recommendation at a display of the portable radio to change to a second antenna with suitable type of impedance to support the talk range requirement.

17. The portable radio of claim 1, wherein the controller is further configured to:
    receive, at the portable radio, an over-the-air transmission of location information of a second portable radio, a second talk range requirement associated with the second portable radio, and antenna information for a second antenna attached to the second portable radio;
    determine that the second antenna is of a same type as that of the portable radio;
    determine that the type of antenna attached to the portable radio can meet the second talk range requirement;
    configure the display of the portable radio to display:
        a recommendation to swap the antenna attached on the portable radio to the second antenna attached to the second portable radio; and
        the location information of the second portable radio.

18. The portable radio of claim 1, when the RF load is identified to be an antenna load, the controller is further configured to:
    transmit over-the-air information identifying antenna type to a public safety dispatch center, wherein the public safety dispatch center determines a second talkgroup channel based on the type of antenna, a task assigned associated to the portable radio, and a talk range requirement associated with the task assigned; and
    receive an over-the-air transmission from the public safety dispatch center to move to second talkgroup channel.

19. The portable radio of claim 18, wherein the determination of the second talkgroup channel is further based on:
    a second type of antenna attached on a second portable radio that is operating on the same talkgroup with the portable radio;
    a second task assigned associated to the second portable radio,
    a second talk range requirement associated with the second task assigned;
    wherein the second talkgroup channel is operating on a second channel frequency associated with the task assigned and the second task assigned, and
    wherein the second channel frequency is supported by both the type of antenna and the second type of antenna, and both the talk range requirement and the second talk range requirement are met at the second channel frequency based on the type of antenna and the second type of antenna.

20. The portable radio of claim 1, wherein the controller is configured to determine a sampling rate for measuring the RF load impedance measurement based on RSSI by configuring the RF switch to couple to the LMR receive circuit;
    receiving a first LMR frequency signal from over-the-air using the LMR receive circuit;
    determine a first Receive Signal Strength Indicator (RSSI) value based on the received LMR frequency signal;
    receiving a second LMR frequency signal from over-the-air using the LMR receive circuit;
    determine a second Receive Signal Strength Indicator (RSSI) value based on the received LMR frequency signal;
    determine a difference value between first and second RSSI value; and
    determine the sampling rate to perform the RF load impedance measurement, wherein the controller configures a higher sampling rate when the difference in value is high, and configures a lower sampling rate when the difference in value is low.

21. The portable radio of claim 1, wherein the antenna port accommodates one of:
    a ferrule antenna; and
    a SubMiniature version A (SMA) antenna.

22. The portable radio of claim 1, wherein the detachable and interchangeable antenna is resistorless.

* * * * *